United States Patent
Fuse et al.

(10) Patent No.: US 10,961,964 B2
(45) Date of Patent: Mar. 30, 2021

(54) INTERNAL COMBUSTION ENGINE CONTROL DEVICE AND CONTROL METHOD

(71) Applicant: TOYOTA JIDOSHA KABUSHIKI KAISHA, Toyota (JP)

(72) Inventors: Yasufumi Fuse, Anjo (JP); Masanori Toya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/631,958

(22) PCT Filed: Aug. 23, 2018

(86) PCT No.: PCT/JP2018/031128
§ 371 (c)(1),
(2) Date: Jan. 17, 2020

(87) PCT Pub. No.: WO2019/049675
PCT Pub. Date: Mar. 14, 2019

(65) Prior Publication Data
US 2020/0224623 A1 Jul. 16, 2020

(30) Foreign Application Priority Data

Sep. 5, 2017 (JP) .............................. JP2017-170476
Mar. 27, 2018 (JP) .............................. JP2018-060404
(Continued)

(51) Int. Cl.
*F02M 61/14* (2006.01)
*F02D 9/08* (2006.01)
*F02D 41/06* (2006.01)
*F02D 41/14* (2006.01)
*F02D 41/34* (2006.01)

(52) U.S. Cl.
CPC ............. *F02M 61/145* (2013.01); *F02D 9/08* (2013.01); *F02D 41/062* (2013.01);
(Continued)

(58) Field of Classification Search
CPC ........ F02D 9/08; F02D 41/1454; F02D 41/34; F02D 2200/021; F02M 61/145
See application file for complete search history.

(56) References Cited

U.S. PATENT DOCUMENTS 5,320,079 A 6/1994 Kuwabara
2002/0157651 A1 10/2002 Hasegawa et al.
(Continued)

FOREIGN PATENT DOCUMENTS

JP 5-214985 8/1993
JP 5-214986 8/1993
(Continued)

*Primary Examiner* — Kevin A Lathers
(74) *Attorney, Agent, or Firm* — Finnegan, Henderson, Farabow, Garrett & Dunner, LLP

(57) ABSTRACT

A multi-injection process includes performing intake synchronized injection in which fuel is injected in synchronism with an open valve period of an intake valve, and an intake asynchronous injection in which fuel is injected at a more advanced timing than during intake synchronized injection. A single-injection process includes injecting a required injection amount of fuel by intake asynchronous injection. An operating process includes operating a port injection valve for injecting fuel into an intake passageway. A selection process includes selecting the single-injection process if the temperature of an intake system of an internal combustion engine is not lower than a prescribed temperature, and selecting the multi-injection process if the temperature of the intake system is less than the prescribed temperature.

14 Claims, 11 Drawing Sheets

(30) Foreign Application Priority Data

| | | |
|---|---|---|
| Mar. 27, 2018 | (JP) | JP2018-060412 |
| Apr. 27, 2018 | (JP) | JP2018-087744 |
| Apr. 27, 2018 | (JP) | JP2018-087745 |
| May 11, 2018 | (JP) | JP2018-092491 |
| May 17, 2018 | (JP) | JP2018-095430 |
| Jun. 22, 2018 | (JP) | JP2018-118801 |

(52) U.S. Cl.
CPC ......... *F02D 41/1454* (2013.01); *F02D 41/34* (2013.01); *F02D 2200/021* (2013.01); *F02D 2200/0406* (2013.01); *F02D 2200/0414* (2013.01); *F02D 2200/703* (2013.01)

(56) References Cited

U.S. PATENT DOCUMENTS

| | | |
|---|---|---|
| 2005/0274353 A1 | 12/2005 | Okubo et al. |
| 2007/0163536 A1 | 7/2007 | Okubo et al. |
| 2017/0096959 A1* | 4/2017 | Kaneko .............. F02D 41/3017 |

FOREIGN PATENT DOCUMENTS

| | | |
|---|---|---|
| JP | 5-256172 | 10/1993 |
| JP | 11-36943 | 2/1999 |
| JP | 2002-327640 | 11/2002 |
| JP | 2004-092424 | 3/2004 |
| JP | 2004-092488 | 3/2004 |
| JP | 2005-188293 | 7/2005 |
| JP | 2005-291133 | 10/2005 |
| JP | 2006-037738 | 2/2006 |
| JP | 2007-263047 | 10/2007 |
| JP | 2010-223063 | 10/2010 |
| JP | 2011-149333 | 8/2011 |
| JP | 2012-136959 | 7/2012 |
| JP | 2013-209938 | 10/2013 |
| JP | 2014-202178 | 10/2014 |
| JP | 2014-211130 | 11/2014 |
| JP | 2014-234730 | 12/2014 |

* cited by examiner

INTERNAL COMBUSTION ENGINE CONTROL DEVICE AND CONTROL METHOD

CROSS-REFERENCE TO RELATED APPLICATIONS

This application is a national stage application of International Application No. PCT/JP2018/031128, filed Aug. 23, 2018, and which is based upon and claims the benefit of priority from Japanese Patent Application Nos. 2017-170476, filed Sep. 5, 2017, 2018-060404 filed Mar. 27, 2018, 2018-060412, filed Mar. 27, 2018, 2018-087744, filed Apr. 27, 2018, 2018-087745, filed Apr. 27, 2018, 2018-092491 filed May 11, 2018, 2018-095430, filed May 17, 2018, and 2018-118801, filed Jun. 22, 2018, the entire contents of which are incorporated herein by reference

TECHNICAL FIELD

The present disclosure relates to a control device and a control method for an internal combustion engine. The control device and the control method are applied to an internal combustion engine including a port injection valve that injects fuel into an intake passage.

BACKGROUND ART

Patent Document 1 describes an example of a control device that executes a multiple injection process for operating a port injection valve. The multiple injection process operates a port injection valve to inject a fuel amount requested that is based on an intake air amount by splitting the fuel amount into an intake stroke injection for injecting fuel in an intake stroke and a combustion stroke injection for injecting fuel in a combustion stroke. More specifically, the control device sets a split ratio of the intake stroke injection to the combustion stroke injection in accordance with the rotation speed of a crankshaft of the internal combustion engine. Particularly, in a low-speed region, the control device performs a single injection process that includes only the combustion stroke injection.

Patent Document 2 describes a control device that injects the amount of fuel calculated based on a water temperature when starting the internal combustion engine. Paragraph [0002] of this document describes that the amount of injection is larger when the water temperature is high than when the water temperature is low.

PRIOR ART DOCUMENTS

Patent Documents

Patent Document 1: Japanese Laid-Open Patent Publication No. 5-256172
Patent Document 2: Japanese Laid-Open Patent Publication No. 5-214986

SUMMARY OF THE INVENTION

Problems that the Invention is to Solve

When it is determined whether the multiple injection process or the single injection process is executed in accordance with the rotation speed as described above, the execution period of the multiple injection process becomes long depending on the operation of the internal combustion engine. When the execution period of the multiple injection process becomes long, the number of times the port injection valve is driven becomes larger than when the single injection process is performed. This may decrease the durability of the port injection valve.

Further, in a case in which the injection amount is increased when the water temperature is low as described in Patent Document 2, the amount of fuel that collects on the intake system of the internal combustion engine such as the intake passage and the intake valve. This may increase the number (PN) of particulate matter (PM).

Means for Solving the Problem

Examples of the present disclosure will now be described.

Example 1

A control device for an internal combustion engine is provided. The control device is applied to the internal combustion engine including a port injection valve that injects fuel into an intake passage. The control device is configured to execute a selection process for selecting a multiple injection process or a single injection process in order to inject the fuel of a requested injection amount that is an injection amount requested in a single combustion cycle, the multiple injection process executing an intake synchronous injection that injects the fuel in synchronization with an open period of an intake valve and an intake asynchronous injection that injects the fuel at a point in time that is more advanced than the intake synchronous injection, the single injection process injecting the fuel of the requested injection amount with the intake asynchronous injection and an operation process for executing the process selected by the selection process by operating the port injection valve. The selection process is a process for selecting the single injection process when a temperature of an intake system of the internal combustion engine is greater than or equal to a given temperature and selecting the multiple injection process when the temperature of the intake system is less than the given temperature.

If the fuel of the requested injection amount is all injected with the intake asynchronous injection when the temperature of the intake system of the internal combustion engine is low, the number (PN) of particulate matter (PM) in exhaust gas may increase depending on load. This is because when the amount of fuel collecting on the intake system increases, shearing the collected fuel presumably causes some of the collected fuel to flow into the combustion chamber in a state in which they remain droplets, thereby generating PM. In the above-described configuration, some of the requested injection amount is injected with the synchronous injection to reduce the asynchronous injection amount. This consequently reduces the amount of fuel collecting on the intake system. This prevents situations in which shearing the collected fuel causes the fuel to flow into the combustion chamber in a state in which the fuel remains droplets.

However, the port injection valve is driven more times when the multiple injection process including the intake synchronous injection and the intake asynchronous injection is executed than when the single injection process is injected. This may reduce the durability of the port injection valve. Thus, in the above-described configuration, while the multiple injection process is executed when the temperature of the intake system is less than the given temperature, the single injection process is executed when the temperature of the intake system becomes greater than or equal to the given temperature. When the temperature of the intake system is high, PN is less likely to become remarkable. Thus, the above-described configuration limits a decrease in the durability of the port injection valve and limits PN.

Example 2

In the control device according to Example 1, the selection process includes a determination process for determining whether the temperature of the intake system of the internal combustion engine is greater than or equal to the given temperature. The determination process is a process for determining that the temperature of the intake system is greater than or equal to the given temperature on the condition that an integration value of an intake air amount of the internal combustion engine is greater than or equal to a determination value. The control device is further configured to execute a requested injection amount calculation process for calculating the requested injection amount as an injection amount to control an air-fuel ratio to a target air-fuel ratio based on an amount of fresh air filling a cylinder of the internal combustion engine.

The integration value of the intake air amount of the internal combustion engine has a positive correlation with the combustion energy in the combustion chamber. Thus, the temperature of the intake system tends to be higher when the integration value is large than when the integration value is small. In particular, the intake valve in the intake system directly receives the heat generated in the combustion chamber. Thus, using the integration value, the temperature of the integration value can be obtained accurately. Thus, like in the above-described configuration, on the condition that the integration air amount is greater than or equal to the determination value, the temperature of the intake system is obtained accurately by executing the determination process for determining that the temperature of the intake system is greater than or equal to the given temperature.

Example 3

The control device according to Example 2 is further configured to execute a first determination value varying process. The first determination value varying process sets the determination value to a larger value when a temperature of coolant in the internal combustion engine is low at a start time of the internal combustion engine than when the temperature of the coolant is high.

The total amount of combustion energy generated in the combustion chamber until the temperature of the intake system becomes greater than or equal to the given temperature when the temperature of the coolant is low than when the temperature of the coolant at the start time of the internal combustion engine. In a case in which the determination value is fixed to the temperature of coolant under a restriction in which the multiple injection process is executed as much as possible when PN needs to be reduced, the multiple injection process is continued even if the temperature of the intake system has actually reached the given temperature when the temperature of the coolant is high at the start time. In the above-described configuration, the determination value is variably set depending on the temperature of the coolant at the start time. Thus, as compared to the case in which the determination value is fixed to the temperature of the coolant, the present process can be advanced to the single injection process as quickly as possible when the temperature of the intake system becomes greater than or equal to the given temperature.

Example 4

In the control device according to Example 2 or 3, the control device is further configured to execute a second determination value varying process. The second determination value varying process sets the determination value to a larger value in a case in which a period from when the internal combustion engine is stopped to when the internal combustion engine is started is long than in a case in which the period is short.

Generally, there is a tendency for the temperature of the intake system such as the intake valve not to match the temperature of the coolant when the stop time of the internal combustion engine is shorter than the time required for the internal combustion engine and its surroundings to reach the thermal equilibrium state. Further, in the case in which the stop time of the internal combustion engine is shorter than the time required for the internal combustion engine and its surroundings to reach the thermal equilibrium state, the temperature of the intake system tends to be lower when the stop time of the internal combustion engine is long than when the stop time is short. In a case in which the determination value is fixed to the stop time under a restriction in which the multiple injection process is executed as much as possible when PN needs to be reduced, the multiple injection process is continued even if the temperature of the intake system actually reaches the given temperature when the stop time is short. In the above-described configuration, the determination value is variably set depending on the stop time. Thus, as compared to the case in which the determination value is fixed to the stop time, the present process can be advanced to the single injection process as quickly as possible when the temperature of the intake system becomes greater than or equal to the given temperature.

Example 5

In the control device according to any one of Examples 2 to 4, the determination process includes a process for determining that the temperature of the intake system is greater than or equal to the given temperature when a logical conjunction of the integration value being greater than or equal to the determination value and the temperature of the coolant in the internal combustion engine being greater than or equal to a predetermined temperature.

In the above-described configuration, it is determined whether the temperature of the intake system is greater than or equal to the given temperature based on the temperature of coolant in addition to the integration value of the intake air amount. Thus, it is accurately determined whether the temperature of the intake system affecting PN is greater than or equal to the given temperature.

Example 6

In the control device according to any one of examples 1 to 5, the requested injection amount is calculated regardless of a detection value of an intake air amount so that the fuel of the requested injection amount is injected at a start time of the internal combustion engine. The selection process further includes a process for selecting the single injection process when a temperature of coolant in the internal combustion engine is greater than or equal to a water given temperature and selecting the multiple injection process when the temperature of the coolant is less than the water given temperature.

If the fuel of the requested injection amount is all injected with the intake asynchronous injection when the temperature of the intake system of the internal combustion engine is low, the number (PN) of particulate matter (PM) in exhaust gas may increase. This is because when the amount of fuel collecting on the intake system increases, shearing the collected fuel presumably causes some of the collected fuel to flow into the combustion chamber in a state in which they remain droplets, thereby generating PM. Thus, in the above-described configuration, when the temperature of coolant having a positive correlation with the temperature of the intake system is less than the water given temperature, some of the requested injection amount is injected with the synchronous injection. This reduces the asynchronous injection amount and consequently reduces the amount of fuel collecting on the intake system. This prevents situations in which shearing the collected fuel causes the fuel to flow into the combustion chamber in a state in which the fuel remains droplets.

Example 7

In the control device according to Example 6, the selection process includes a process for selecting, in a case in which the internal combustion engine is intermittently driven, the multiple injection process until an integration value of an amount of air drawn into the intake passage becomes greater than or equal to a predetermined value even when the temperature of the coolant in the internal combustion engine is greater than or equal to the water given temperature.

The integration value of the amount of air drawn into the intake passage has a positive correlation with the combustion energy in the combustion chamber. Thus, the temperature of the intake system tends to be higher when the integration value is large than when the integration value is small. In particular, the intake valve in the intake system directly receives the heat generated in the combustion chamber. Thus, using the integration value, the temperature of the integration value can be obtained accurately. Thus, the multiple injection process is executed until the integration value becomes greater than or equal to the predetermined value like in the above-described configuration. Accordingly, as compared to when such setting is not made, the water given temperature can be set to a lower value.

Example 8

In the control device according to Example 6 or 7, the control device is further configured to execute an asynchronous injection amount calculation process for calculating an asynchronous injection amount that is an injection amount of the intake asynchronous injection in the multiple injection process. The asynchronous injection amount calculation process includes a process for calculating the asynchronous injection amount to be a larger value when the temperature of the coolant in the internal combustion engine is low than when the temperature of the coolant is high and a process for calculating the asynchronous injection amount to be a smaller value in a case in which an elapsed time from when the internal combustion engine is stopped to when the internal combustion engine is started is short than in a case in which the elapsed time is long.

The amount of fuel that is not subject to combustion in the combustion chamber in the fuel injected from the port injection valve and remains in the intake system becomes larger when the temperature of the intake system is low than when the temperature of the intake system is high. In the above-described configuration, the asynchronous injection amount is calculated to be a larger value when the temperature of coolant having a positive correlation with the temperature of the intake system is low than when the temperature of the coolant is high. Thus, the air-fuel ratio of air-fuel mixture subject to combustion in the combustion chamber is prevented from becoming excessively lean.

There is a tendency for the temperature of the intake system such as the intake valve not to match the temperature of the coolant when the stop time of the internal combustion engine is shorter than the time required for the internal combustion engine and its surroundings to reach the thermal equilibrium state. Further, in the case in which the stop time of the internal combustion engine is shorter than the time required for the internal combustion engine and its surroundings to reach the thermal equilibrium, the temperature of the intake system tends to be higher when the stop time of the internal combustion engine is short than when the stop time is long. If the asynchronous injection amount is calculated without taking the stop time into consideration even when the stop time of the internal combustion engine is short, the asynchronous injection amount may become excessive and the air-fuel ratio in the combustion chamber may become excessively rich. In the above-described configuration, the asynchronous injection amount is set to be a smaller value when the stop time of the internal combustion engine is short than when the stop time is short. Thus, the air-fuel ratio of air-fuel mixture subject to combustion in the combustion chamber is prevented from becoming excessively rich.

Example 9

The control device according to Example 8 is further configured to execute a stop time calculation process for calculating an intermittent integration stop time when the internal combustion engine is intermittently driven. The stop time calculation process calculates the intermittent integration stop time by reducing, with a reduction correction ratio, an accumulated time in which the internal combustion engine is stopped, after the internal combustion engine is started the reduction correction ratio being larger when the integration value of the amount of air drawn into the intake passage is large than when the integration value of the amount of air is small. The asynchronous injection amount calculation process includes a process for calculating the asynchronous injection amount to be a larger value when the intermittent integration stop time is long than when the intermittent integration stop time is short.

When the internal combustion engine is intermittently driven, the time required for the internal combustion engine and its surroundings to reach the thermal equilibrium state at the stop time of the internal combustion engine has a positive correlation with the total amount of combustion energy at the drive time of the internal combustion engine. In the above-described configuration, the accumulated time in which the internal combustion engine is stopped is reduced by using the integration value of the amount drawn into the intake passage, and the reduced value is set as the intermittent integration stop time. Thus, the intermittent integration stop time can be set as a parameter that indicates the temperature of the intake system with high accuracy. Thus, calculating the asynchronous injection amount based on the intermittent integration stop time prevents the air-fuel ratio of air-fuel mixture subject to combustion in the combustion chamber from excessively deviating from a target.

Example 10

In the control device according to Example 8 or 9, the asynchronous injection amount calculation process includes a process for calculating the asynchronous injection amount to be a larger value when an atmospheric pressure is high than when the atmospheric pressure is low.

The pressure in the intake passage at the start time is higher when the atmospheric pressure is high than when the atmospheric pressure is low. Thus, the amount of air filling the combustion chamber increases. In the above-described configuration, the asynchronous injection amount is set to be a larger value when the atmospheric pressure is high than when the atmospheric pressure is low. Thus, even when the atmospheric pressure is high, the air-fuel ratio of air-fuel mixture subject to combustion in the combustion chamber is prevented from becoming excessively lean.

Example 11

In the control device according to Example 10, the internal combustion engine includes a throttle valve, and the asynchronous injection amount calculation process includes a process for calculating the asynchronous injection amount to be a smaller value when an intake pressure is low than when the intake pressure is high in a case in which the start time of the internal combustion engine is a restart time of the internal combustion engine.

Immediately after the internal combustion engine is stopped, the pressure in the intake passage tends to be smaller than the atmospheric pressure and tends to converge to the atmospheric pressure as the time elapses. Thus, in some cases, at the restart time, the pressure in the intake passage is still lower than the atmospheric pressure. In this case, for example, as compared to when the pressure in the intake passage is the atmospheric pressure, the saturation vapor pressure of fuel in the intake passage is lower. Thus, the fuel is atomized easily. Accordingly, the amount of fuel that remains in the intake system without flowing into the combustion chamber in the fuel injected from the port injection valve tends to be smaller when the pressure in the intake passage is still lower than the atmospheric pressure at the restart time than when, for example, the pressure in the intake passage has converged into the atmospheric pressure immediately before the restart. In the above-described configuration, the asynchronous injection amount is calculated to be a smaller value when the intake pressure is low than when the intake pressure is high. Thus, the air-fuel ratio of air-fuel mixture subject to combustion in the combustion chamber is prevented from becoming excessively rich at the restart time.

Example 12

The control device according to any one of Examples 9 to 11, the control device is further configured to execute a synchronous injection amount calculation process for calculating a synchronous injection amount that is an injection amount of the intake synchronous injection. The synchronous injection amount calculation process calculates the synchronous injection amount based on the temperature of the coolant in the internal combustion engine without depending on the elapsed time from when the internal combustion engine is stopped to when the internal combustion engine is started.

The elapsed time from when the internal combustion engine is stopped to when the internal combustion engine is started has a negative correlation with the temperature of the intake system. Thus, the elapsed time has a positive correlation with the amount of fuel that collects on and remains in the intake system without flowing into the combustion chamber in the intake asynchronous injection amount. The correlation of the elapsed time with the amount of fuel that collects on and remains in the intake system without flowing into the combustion chamber in the synchronous injection amount is not as strong as the correlation of the elapsed time with the amount of fuel that collects on and remains in the intake system without flowing into the combustion chamber in the asynchronous injection amount. Thus, in the above-described configuration, while the asynchronous injection amount is determined in accordance with the elapsed time, the synchronous injection amount is determined regardless of the elapsed time. Accordingly, the amount of fuel that remains in the intake system is used to control the injection amount of the intake asynchronous injection in which the amount of fuel that collects on and remains in the intake system without flowing into the combustion chamber may be remarkable.

Example 13

A control device for an internal combustion engine is provided. The control device is applied to the internal combustion engine including a port injection valve that injects fuel into an intake passage. The control device is configured to execute a selection process for selecting a multiple injection process or a single injection process in order to inject the fuel of a requested injection amount calculated regardless of a detection value of an intake air amount at a start time of the internal combustion engine, the multiple injection process executing an intake synchronous injection that injects the fuel in synchronization with an open period of an intake valve and an intake asynchronous injection that injects the fuel at a point in time that is more advanced than the intake synchronous injection, the single injection process injecting the fuel of the requested injection amount with the intake asynchronous injection and an operation process for executing the process selected by the selection process by operating the port injection valve. The selection process includes a process for selecting the single injection process when a temperature of coolant in the internal combustion engine is greater than or equal to a water given temperature and selecting the multiple injection process when the temperature of the coolant is less than the water given temperature.

Example 14

A control method for an internal combustion engine that executes the various processes described in Examples 1 to 13 is provided. The control method is applied to the internal combustion engine including a port injection valve that injects fuel into an intake passage. The control method includes a selection process for selecting a multiple injection process or a single injection process in order to inject the fuel of a requested injection amount that is an injection amount requested in a single combustion cycle, the multiple injection process executing an intake synchronous injection that injects the fuel in synchronization with an open period of an intake valve and an intake asynchronous injection that injects the fuel at a point in time that is more advanced than the intake synchronous injection, the single injection process injecting the fuel of the requested injection amount with the intake asynchronous injection and an operation process for executing the process selected by the selection process by operating the port injection valve. The selection process is a process for selecting the single injection process when a temperature, of an intake system of the internal combustion engine is greater than or equal to a given temperature and selecting the multiple injection process when the temperature of the intake system is less than the given temperature.

Example 15

A non-transitory computer readable memory medium is provided that stores a program that causes a processor to execute the various processes described in Examples 1 to 13.

MODES FOR CARRYING OUT THE INVENTION

A control device for an internal combustion engine according to a first embodiment of the present disclosure will now be described with reference to FIGS. 1 to 6.

Figure 1:
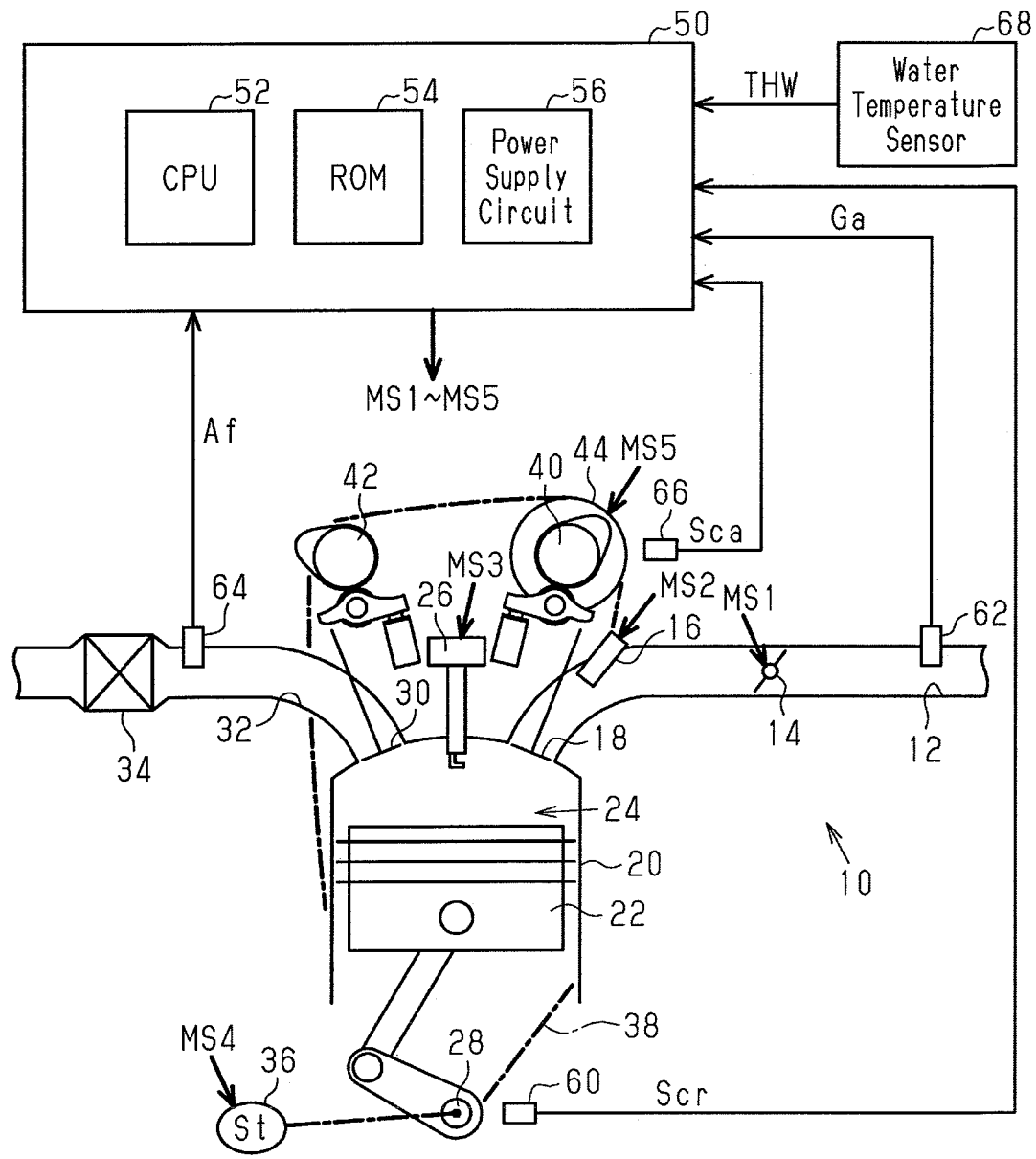
FIG. 1 is a diagram showing a control device and an internal combustion engine according to a first embodiment of the present disclosure.

FIG. 1 shows the internal combustion engine 10, which is a sole engine that generates the thrust of a vehicle. The internal combustion engine 10 includes an intake passage 12. The intake passage 12 includes, sequentially from the upstream side, a throttle valve 14 and a port injection valve 16. The air drawn into the intake passage 12 and the fuel injected from the port injection valve 16 flow into a combustion chamber 24, which is defined by a cylinder 20 and a piston 22, as an intake valve 18 opens. The air-fuel mixture of fuel and air drawn into the combustion chamber 24 is burned by the spark discharge of an ignition device 26. The energy generated through the combustion is converted into rotation energy of a crankshaft 28 by the piston 22. The burned air-fuel mixture is discharged to an exhaust passage 32 as exhaust gas when an exhaust valve 30 opens. The exhaust passage 32 is provided with a catalyst 34.

The rotation power of the crankshaft 28 is transmitted through a timing chain 38 to an intake camshaft 40 and an exhaust camshaft 42. In the present embodiment, the power of the timing chain 38 is transmitted to the intake camshaft 40 through an intake valve timing adjustment device 44. The intake valve timing adjustment device 44 is an actuator that adjusts a valve-opening timing of the intake valve 18 by adjusting a rotation phase difference between the crankshaft 28 and the intake camshaft 40.

The control device 50 controls the internal combustion engine 10. In order to control a control amount (for example, torque or exhaust component ratio) of the internal combustion engine 10, the control device 50 operates operation units of the internal combustion engine 10 such as the throttle valve 14, the port injection valve 16, the ignition device 26, and the intake valve timing adjustment device 44. The control device 50 refers to an output signal Scr of a crank angle sensor 60, an intake air amount Ga, which is detected by an airflow meter 62, an air-fuel ratio Af, which is detected by an air-fuel ratio sensor 64, an output signal Sca of an intake cam angle sensor 66, the temperature of coolant (water temperature THW) of the internal combustion engine 10, which is detected by a water temperature sensor 68. FIG. 1 shows operation signals MS1 to MS5, which are respectively used to operate the throttle valve 14, the port injection valve 16, the ignition device 26, a starter motor 36, and the intake valve timing adjustment device 44.

The control device 50 includes a CPU 52, a ROM 54, and a power supply circuit 56 and controls the above-described control amount by the CPU 52 executing programs stored in the ROM 54. The power supply circuit 56 supplies power to each part in the control device 50.

Figure 2:
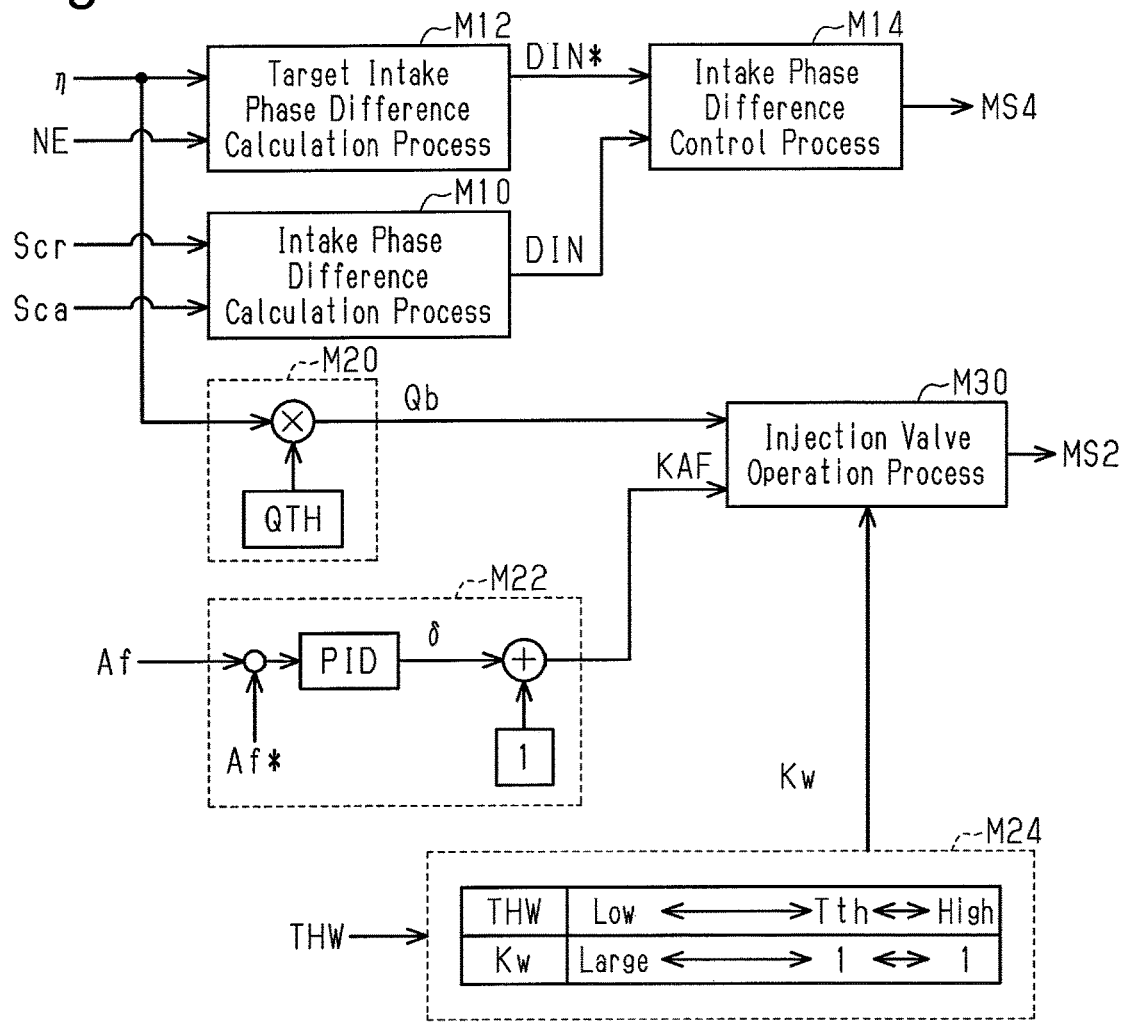
FIG. 2 is a block diagram showing part of processes executed by the control device in the internal combustion engine of FIG. 1.

FIG. 2 shows part of the processes executed by control device 50. The processes shown in FIG. 2 are implemented by the CPU 52 executing the programs stored in the ROM 54.

An intake phase difference calculation process M10 is a process for calculating an intake phase difference DIN, which is a phase difference of the rotation angle of the intake camshaft 40 relative to the rotation angle of the crankshaft 28, based on the output signal Scr of the crank angle sensor 60 and the output signal Sca of the intake cam angle sensor 66. A target intake phase difference calculation process M12 is a process for variably setting a target intake phase difference DIN* based on the operating point of the internal combustion engine 10. In the present embodiment, the operation point is defined by a rotation speed NE and a charging efficiency η. The CPU 52 calculates the rotation speed NE based on the output signal Scr of the crank angle sensor 60 and calculates the charging efficiency η based on the rotation speed NE and the intake air amount Ga. The charging efficiency η is a parameter that determines the amount of fresh air filling the combustion chamber 24.

An intake phase difference control process M14 is a process for outputting the operation signal MS4 to the intake valve timing adjustment device 44 in order to operate the intake valve timing adjustment device 44 so that the intake phase difference DIN is controlled to the target intake phase difference DIN*.

A base injection amount calculation process M20 is a process for calculating a base injection amount Qb based on the charging efficiency η. The base injection amount Qb is the base value of a fuel amount for setting the air-fuel ratio of the air-fuel mixture in the combustion chamber 24 to a target air-fuel ratio. More specifically, when, for example, the charging efficiency η is expressed in percentage, the base injection amount calculation process M20 simply needs to be a process for calculating the base injection amount Qb by multiplying the charging efficiency η by a fuel amount QTH per one percent of the charging efficiency η for setting the air-fuel ratio to the target air-fuel ratio. That is, the injection amount the base injection amount Qb is a fuel amount calculated to control the air-fuel ratio to the target air-fuel ratio based on the amount of fresh air filling the combustion chamber 24. The target air-fuel ratio simply needs to be set to, for example, a stoichiometric air-fuel ratio.

A feedback process M22 is a process for calculating and outputting a feedback correction coefficient KAF, which is obtained by adding 1 to a correction ratio δ of the base injection amount Qb. The correction ratio δ of the base injection amount Qb is a feedback operation amount for performing feedback control on the air-fuel ratio Af to a target value Af*. More specifically, the feedback process M22 sets, to the correction ratio δ, the sum of the output values of a proportional element and a differential element in which the difference between the air-fuel ratio Af and the target value Af* is an input and the output value of an integral element that maintains and outputs the integration value of a value corresponding to the difference between the air-fuel ratio Af and the target value Af*.

A low-temperature correction process M24 is a process for calculating a low-temperature increase coefficient Kw to be greater than 1 in order to increase the base injection amount Qb when the water temperature THW is less than a predetermined temperature Tth (for example, 60° C.). More specifically, the low-temperature increase coefficient Kw is calculated to be larger when the water temperature THW is low than when the water temperature THW is high. When the water temperature THW is greater than or equal to the predetermined temperature Tth, the low-temperature increase coefficient Kw is set to 1 and the correction amount of the base injection amount Qb with the low-temperature increase coefficient Kw is set to 0.

An injection valve operation process M30 is a process for outputting the operation signal MS2 to the port injection valve 16 in order to operate the port injection valve 16 based on the base injection amount Qb, the feedback correction coefficient KAF, and the low-temperature increase coefficient Kw. More specifically, the injection valve operation process M30 is a process for causing the port injection valve 16 to inject a requested injection amount Qd, which is the amount of fuel requested to be supplied to a single cylinder in a single combustion cycle from the port injection valve 16. The requested injection amount Qd is KAF·Kw·Qb.

Figure 3:
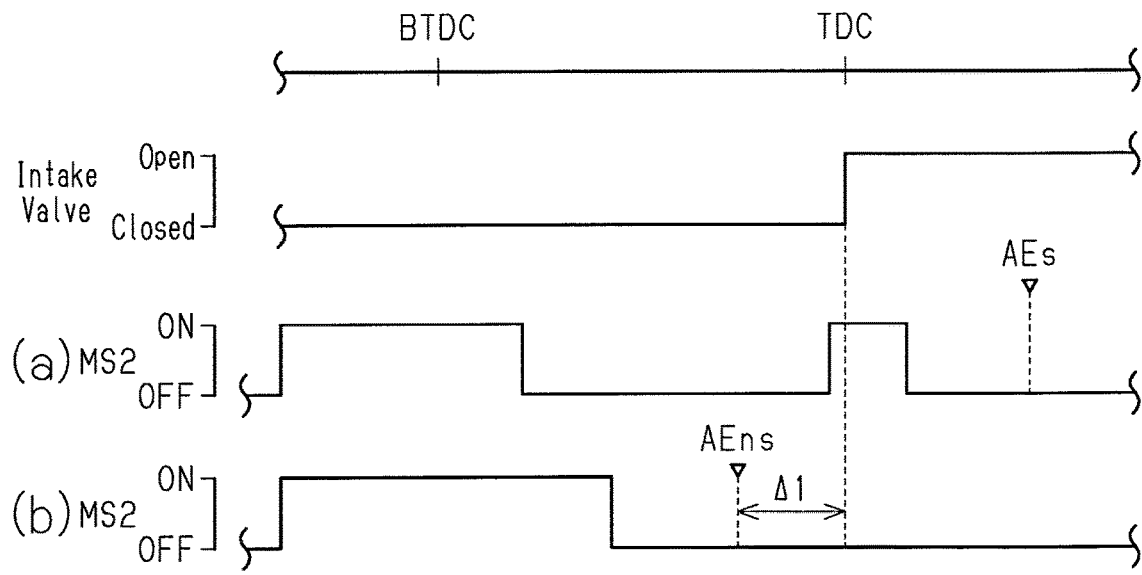
FIG. 3 shows injection patterns in the internal combustion engine of FIG. 1, including section (a) and section (b).

In the present embodiment, there are two types of fuel injection processes, namely, a process illustrated in section (a) of FIG. 3 and a process illustrated in section (b) of FIG. 3.

Section (a) of FIG. 3 illustrates an intake synchronous injection, which injects fuel in synchronization with an open period of the intake valve 18, and an intake asynchronous injection, which injects fuel at a point in time advanced with respect to the intake synchronous injection. More specifically, the intake synchronous injection is to inject fuel such that the period in which the fuel injected from the port injection valve 16 reaches the position of the intake valve 18 prior to opening is within the open period of the intake valve 18. The position of the intake valve 18 prior to opening is the downstream end of the intake port, that is, the inlet of the intake port for the combustion chamber 24. The starting point of the fuel-reaching period is the point in time at which the fuel injected at the earliest point in time in the fuel injected from the port injection valve 16 reaches the position of the intake valve 18 prior to opening. The end point of the fuel-reaching period is the point in time at which the fuel injected at the latest point in time in the fuel injected from the port injection valve 16 reaches the position of the intake valve 18 prior to opening. The intake asynchronous injection is to inject fuel such that the fuel injected from the port injection valve 16 reaches the intake valve 18 before the intake valve 18 opens. In other words, the intake asynchronous injection is an injection in which the fuel injected from the port injection valve 16 remains in the intake passage 12 until the intake valve 18 opens and flows into the combustion chamber 24 after the intake valve 18 opens. In the present embodiment, in the intake asynchronous injection, fuel is injected such that the period in which the fuel injected from the port injection valve 16 reaches the position of the intake valve 18 prior to opening is within a closed period of the intake valve 18.

Section (b) of FIG. 3 illustrates a single injection process for executing only the intake asynchronous injection.

In the present embodiment, the multiple injection process is executed with the intention of reducing the number (PN) of particulate matter (PM) in exhaust gas. That is, in a case in which the temperature of the intake system of the internal combustion engine 10 such as the intake passage 12 and the intake valve 18 is low to a certain extent, PN tends to increase when the single injection process is executed in a region where the charging efficiency η is high to a certain extent. This may be because the requested injection amount Qd is larger when the charging efficiency η is high than when the charging efficiency η is low and thus the amount of fuel collecting on the intake system increases. More specifically, when the amount of fuel collecting on the intake system increases to a certain extent, shearing the collected fuel presumably causes some of the collected fuel to flow into the combustion chamber 24 in a state in which they remain droplets. In the present embodiment, even when the requested injection amount Qd is large, injecting some of the requested injection amount Qd with the intake synchronous injection reduces the amount of fuel collecting on the intake system considering a large amount of the requested injection amount Qd and consequently reduces PN.

Figure 4:
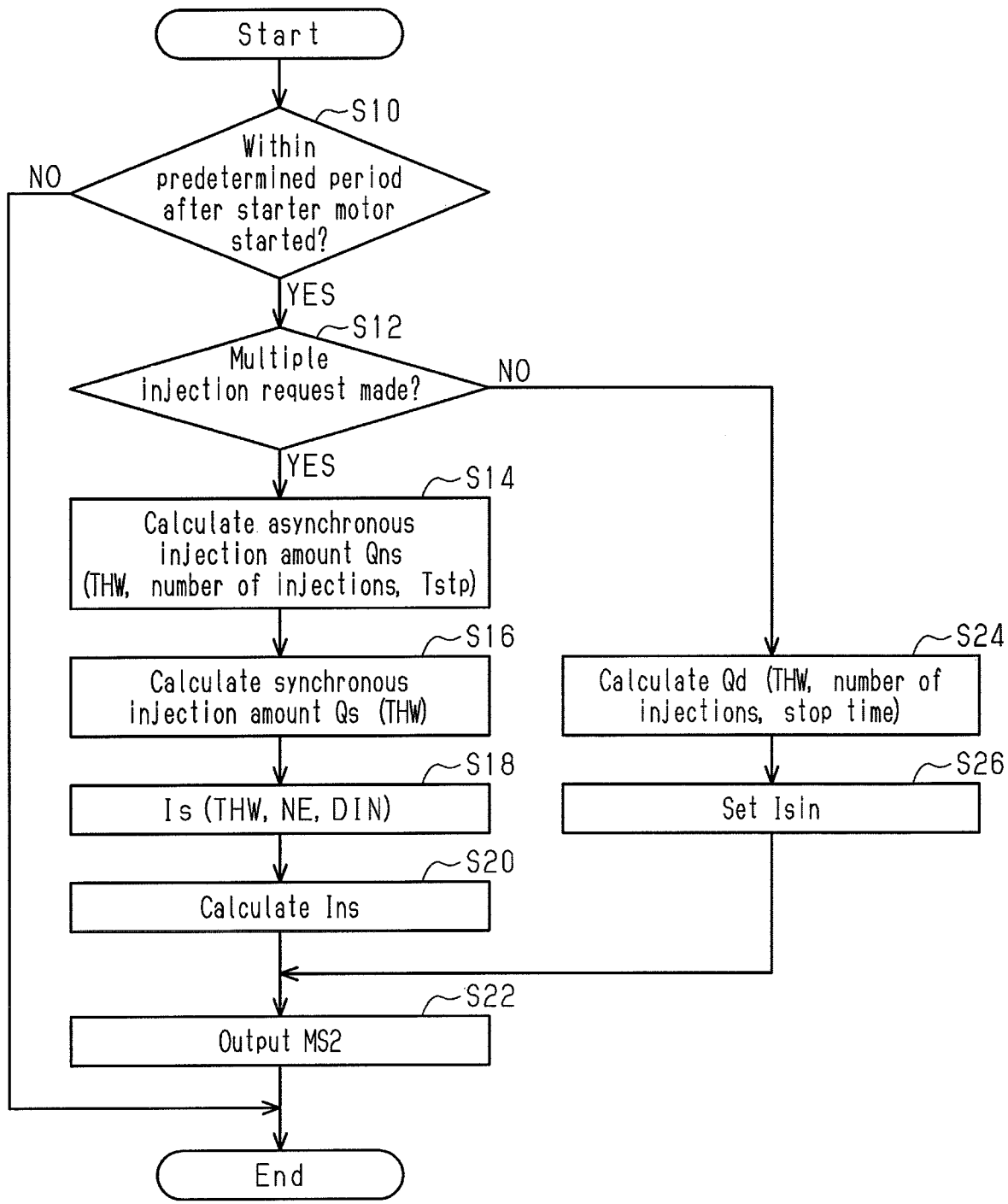
FIG. 4 is a flowchart illustrating a procedure for an injection valve operation process in the internal combustion engine of FIG. 1.

FIG. 4 illustrates a procedure for the injection valve operation process M30. The processes shown in FIG. 4 are executed by the CPU 52 repeatedly executing programs stored in the ROM 54 at a predetermined interval. In the following description, the number of each step is represented by the letter S followed by a numeral.

In a series of processes illustrated in FIG. 4, the CPU 52 first determines whether the current time is within a predetermined period after the starter motor 36 was started (S10). The predetermined period refers to a period in which the amount of air filling the combustion chamber 24 cannot be obtained precisely and thus the base injection amount Qb cannot be calculated precisely. When determining that the current time is within a predetermined period after the starter motor 36 was started (S10: YES), the CPU 52 determines whether a request for the multiple injection process has been made (S12). When determining that the request for the multiple injection process has been made (S12: YES), the CPU 52 calculates an asynchronous injection amount Qns, which is an injection amount of the intake asynchronous injection, based on the water temperature THW, the number of injections after the starter was turned on, and a stop time Tstp of the internal combustion engine 10 (S14). The stop time Tstp of the internal combustion engine 10 is the time elapsed from when the internal combustion engine 10 was previously stopped to when the internal combustion engine 10 is currently started. The CPU 52 calculates the asynchronous injection amount Qns to be larger when the water temperature THW is low than when the water temperature THW is high. The CPU 52 calculates the asynchronous injection amount Qns to be larger when the stop time Tstp is long than when the stop time Tstp is short.

Subsequently, the CPU 52 uses the water temperature THW to calculate a synchronous injection amount Qs, which is an injection amount of the intake synchronous injection (S16). The CPU 52 calculates the synchronous injection amount Qs to be larger when the water temperature THW is low than when the water temperature THW is high.

The sum of the asynchronous injection amount Qns and the synchronous injection amount Qs is the requested injection amount Qd, which is an injection amount requested in a single combustion cycle. That is, the processes of S14 and S16 are processes for dividing the fuel of the requested injection amount Qd into the asynchronous injection amount Qns and the synchronous injection amount Qs.

Then, the CPU 52 uses the water temperature THW, the rotation speed NE, and the intake phase difference DIN to calculate an injection start timing Is of the intake synchronous injection (S18). This is a process for performing map calculation for the injection start timing Is using the CPU 52 in a state in which the ROM 54 stores in advance map data including the water temperature THW, the rotation speed NE, and the intake phase difference DIN as input variables and including the injection start timing Is as an output variable. The map data refers to a data set of discrete values of input variables and values of output variables each corresponding to a value of the input variables. When the value of an input variable matches any of the values of the input variable on the map data, the map calculation uses the value of the corresponding output variable on the map data as the calculation result. When the value of the input variable does not match any of the values of the input variable on the map data, the map calculation uses a value obtained by interpolation of multiple values of the output variable included in the map data set as the calculation result.

Next, the CPU 52 calculates an injection start timing Ins of the intake asynchronous injection (S20). The CPU 52 calculates the injection start timing Ins of the intake asynchronous injection such that the time interval between an injection end timing of the intake asynchronous injection and the injection start timing Is of the intake synchronous injection is greater than or equal to a predetermined time. The predetermined time is determined by the structure of the port injection valve 16. In two fuel injections adjacent to each other chronologically, namely, injection on the advanced side and injection on the retarded side, the injection on the retarded side is prevented from starting before the advanced-side injection ends by the predetermined time.

The CPU 52 operates the port injection valve 16 by outputting the operation signal MS2 to the port injection valve 16 to cause the fuel of the asynchronous injection amount Qns to be injected at the injection start timing Ins and then, operates the port injection valve 16 by outputting the operation signal MS2 to the port injection valve 16 to cause the fuel of the synchronous injection amount Qs to be injected at the injection start timing Is (S22).

When determining that the request for executing the multiple injection process has not been made (S12: NO), the CPU 52 calculates the requested injection amount Qd, which is an injection amount requested in a single combustion cycle, based on the water temperature THW, the number of injections after the starter was turned on, and the stop time Tstp (S24). Subsequently, the CPU 52 sets an injection start timing Isin (S26). Then, the CPU 52 operates the port injection valve 16 by outputting the operation signal MS2 of the port injection valve 16 to cause the fuel of the requested injection amount Qd to be injected at the injection start timing Isin (S22).

When completing the process of S22 or when making a negative determination in the process of S10, the CPU 52 temporarily ends the series of processes shown in FIG. 4.

Figure 5:
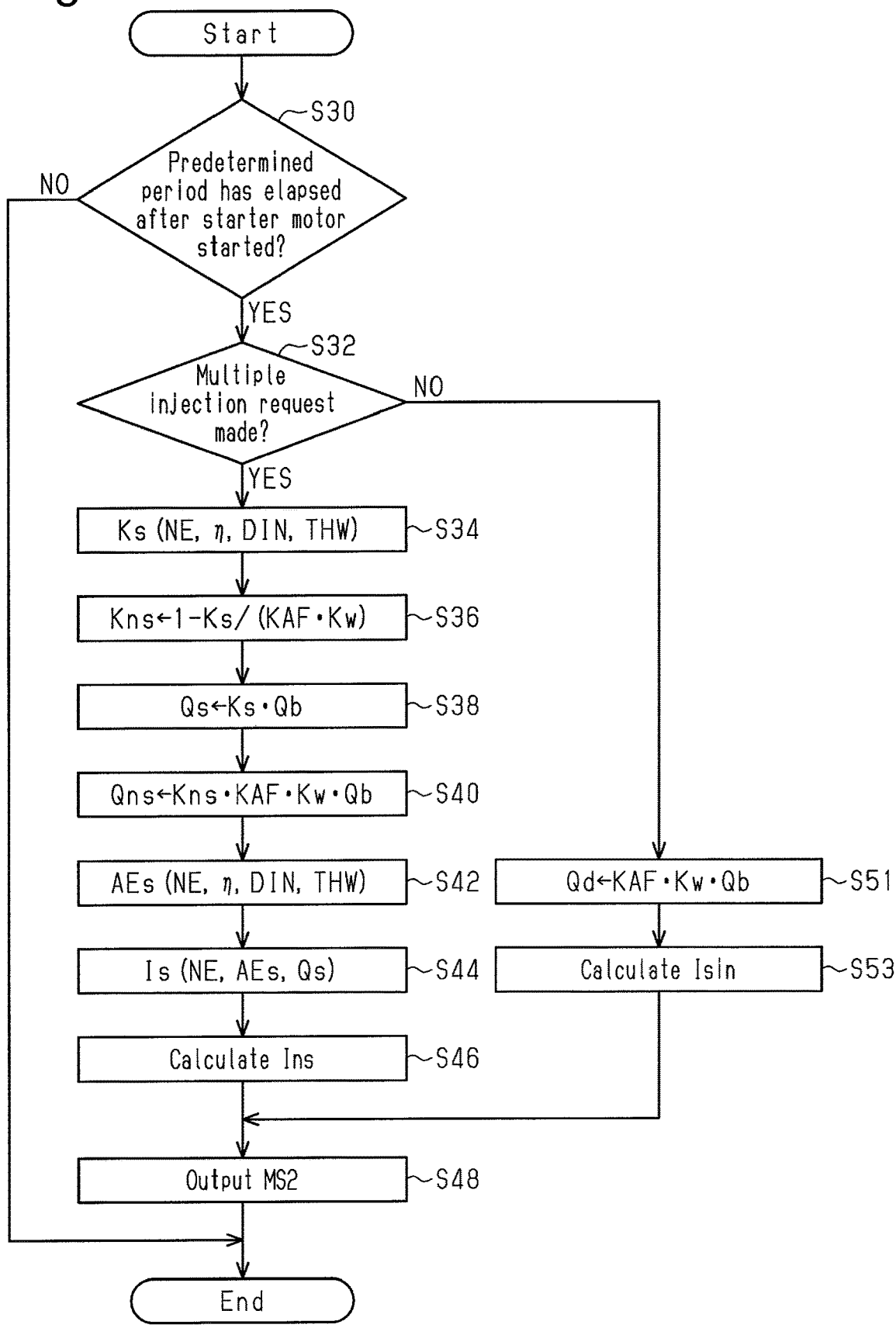
FIG. 5 is a flowchart illustrating a procedure for the injection valve operation process in the internal combustion engine of FIG. 1.

FIG. 5 illustrates a procedure for the injection valve operation process M30. The processes shown in FIG. 5 are executed by the CPU 52 repeatedly executing programs stored in the ROM 54 at a predetermined interval.

In a series of processes illustrated in FIG. 5, the CPU 52 first determines whether the predetermined period has elapsed since the starter motor 36 was activated (S30). When determining that the predetermined period has elapsed since the starter motor 36 was activated (S30: YES), the CPU 52 determines whether the multiple injection request has been made (S32). When determining that the multiple injection request has been made (S32: YES), the CPU 52 calculates a synchronous injection ratio Ks, which is the ratio of the synchronous injection amount Qs in the base injection amount Qb (S34). The CPU 52 calculates the synchronous injection ratio Ks in accordance with the rotation speed NE, the charging efficiency η, the water temperature THW, and the intake phase difference DIN. More specifically, the CPU 52 performs map calculation for the synchronous injection ratio Ks in a state in which the ROM 54 stores in advance map data including the rotation speed NE, the charging efficiency η, the water temperature THW, and the intake phase difference DIN as input variables and including the synchronous injection ratio Ks as an output variable.

Subsequently, the CPU 52 calculates an asynchronous injection ratio Kns as a ratio of the asynchronous injection amount Qns to the requested injection amount Qd (S36). More specifically, the CPU 52 calculates the asynchronous injection ratio Kns by subtracting Ks/(KAF·Kw) from 1. Next, the CPU 52 substitutes, into the synchronous injection amount Qs, a value obtained by multiplying the base injection amount Qb by the synchronous injection ratio Ks. (S38) Then, the CPU 52 substitutes, into the asynchronous injection amount Qns, a value obtained by multiplying the requested injection amount Qd by the asynchronous injection ratio Kns (S40).

Accordingly, the asynchronous injection amount Qns is the following value.

$$Kns \cdot KAF \cdot Kw \cdot Qb = KAF \cdot Kw \cdot Qb - Ks \cdot Qb$$

Thus, the sum of the asynchronous injection amount Qns and the synchronous injection amount Qs is KAF·Kw·Qb, which is equal to the requested injection amount Qd. That is, the processes of S34 to S40 are performed to divide the fuel of the requested injection amount Qd into the asynchronous injection amount Qns and the synchronous injection amount Qs. The synchronous injection amount Qs is unaffected by the values of the feedback correction coefficient KAF and the low-temperature increase coefficient Kw and is Ks·Qb. This means that the base injection amount Qb is divided into the synchronous injection amount Qs and (1−Ks)·Qb and then the value corrected to (1−Ks) Qb becomes the asynchronous injection amount Qns. The synchronous injection amount Qs is fixed in this manner because the changes in exhaust component ratios when the synchronous injection amount Qs is changed are more remarkable than the changes in exhaust component ratios when the asynchronous injection amount Qns is changed.

Subsequently, the CPU 52 uses the rotation speed NE, the water temperature THW, and the intake phase difference DIN to calculate a reach end timing AEs, which is shown in section (a) of FIG. 3 (S42). The reach end timing AEs refers to a target value of the point in time at which the fuel injected at the latest point in time in the fuel injected from the port injection valve 16 reaches the position of the intake valve 18 during the closed period (the lower end of the intake port, i.e., the inlet of the combustion chamber 24). Then, the CPU 52 calculates the injection start timing Is of the intake synchronous injection based on the reach end timing AEs, the synchronous injection amount Qs, and the rotation speed NE (S44). The CPU 52 calculates the injection start timing Is to be more advanced when the synchronous injection amount Qs is large than when the synchronous injection amount Qs is small. Further, the CPU 52 calculates the injection start timing Is to be more advanced when the rotation speed NE is large than when the rotation speed NE is small. More specifically, the CPU 52 sets, as the injection start timing Is, the point in time advanced with respect to the reach end timing AEs by a value obtained by adding, for example, a period of injection by the port injection valve 16 determined from the synchronous injection amount Qs and a travel time by which the fuel injected from the port injection valve 16 reaches the position of the intake valve 18 when closed.

Next, the CPU 52 calculates the injection start timing Ins of the asynchronous injection based on the injection start timing Is (S46). The calculation is performed such that the time interval between the injection end timing of the intake asynchronous injection and the injection start timing Is is greater than or equal to the above-described predetermined time.

The above-described process is performed to set the injection start timing Is of the intake synchronous injection independently from the injection start timing Ins of the intake asynchronous injection. This is because the reach end timing AEs of the intake synchronous injection is easily affected in particular by PN and HC in exhaust gas.

The CPU 52 operates the port injection valve 16 by outputting the operation signal MS2 to the port injection valve 16 to cause the fuel of the asynchronous injection amount Qns to be injected at the injection start timing Ins and then to cause the fuel of the synchronous injection amount Qs to be injected at the injection start timing Is (S48).

When determining that the request for the multiple injection process has not been made (S32: NO), the CPU 52 substitutes KAF·Kw·Qb into the requested injection amount Qd (S51). Next, the CPU 52 calculates the injection start timing Isin of the single injection (S53). More specifically, as shown in section (b) of FIG. 3, the CPU 52 sets, as the reach end timing AEns, the point in time advanced by a predetermined amount Δ1 with respect to the open period of the intake valve 18 (the broken line extending over sections (a) and (b) of FIG. 3). Subsequently, the CPU 52 sets, as the injection start timing Isin of the single injection, the point in time advanced with respect to the reach end timing AEns by a value obtained by adding, for example, a period of injection by the port injection valve 16 determined from the requested injection amount and a travel time by which the fuel injected from the port injection valve 16 reaches the position of the intake valve 18 when closed. Referring back to FIG. 5, the CPU 52 operates the port injection valve 16 by outputting the operation signal MS2 of the port injection valve 16 to cause the fuel of the requested injection amount Qd to be injected at the injection start timing Isin (S48).

When completing the process of S48 or when making a negative determination in the process of S30, the CPU 52 temporarily ends the series of processes shown in FIG. 5.

Figure 6:
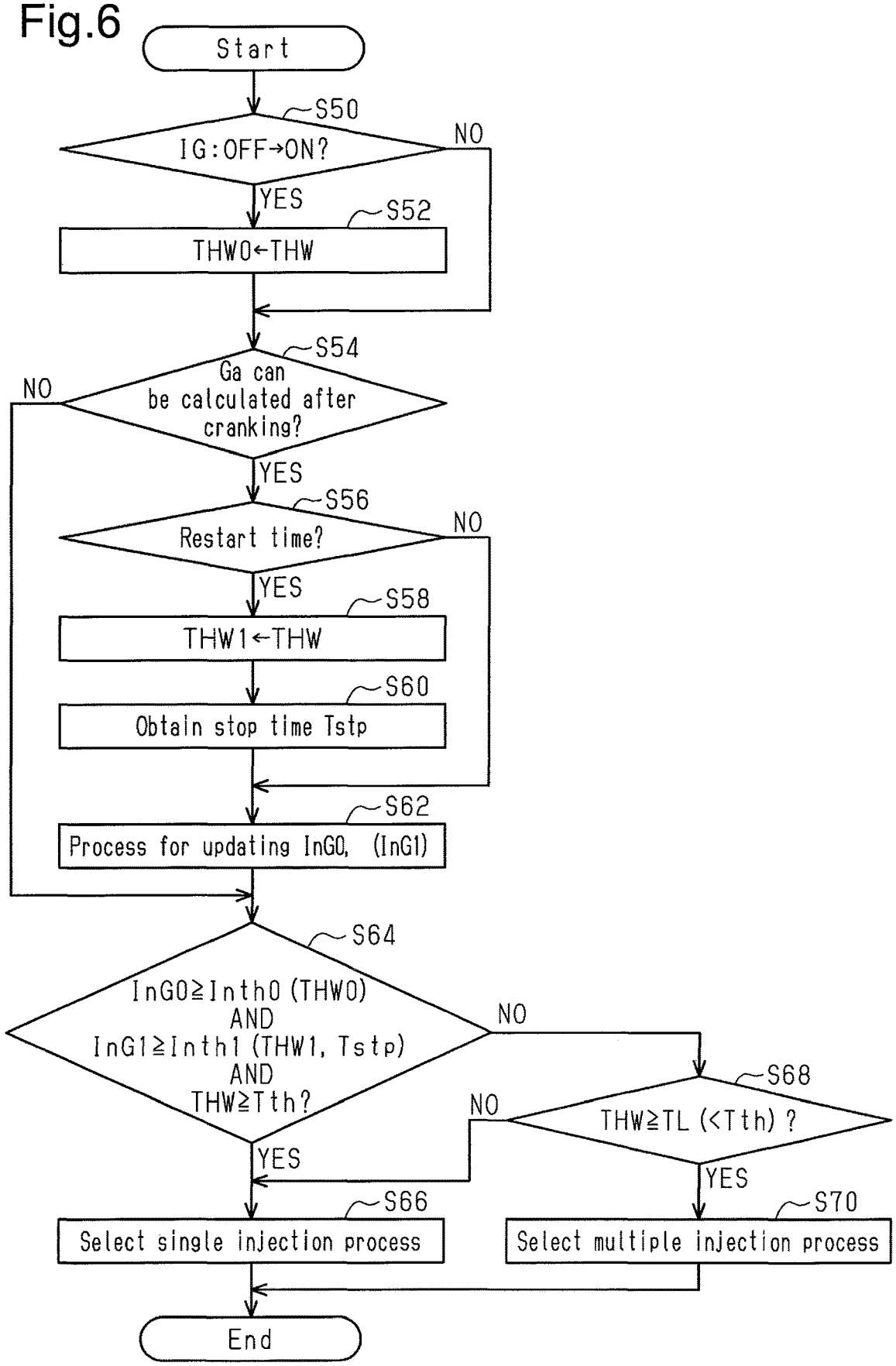
FIG. 6 is a flowchart illustrating a procedure for the injection valve operation process in the internal combustion engine of FIG. 1.

FIG. 6 illustrates a procedure for the injection valve operation process M30, in particular, the determination of the request for executing the multiple injection process. The processes shown in FIG. 6 are executed by the CPU 52 repeatedly executing programs stored in the ROM 54 at a predetermined interval.

In the series of processes shown in FIG. 6, it is determined whether an IG signal corresponding to activation and deactivation of the ignition switch has been switched from off to on (S50). When determining that the IG signal has been switched from off to on (S50: YES), the CPU 52 substitutes the current water temperature THW into an initial water temperature THW0 (S52). When completing the process of S52 and making a negative determination in the process of S50, the CPU 52 determines whether the intake air amount Ga can be calculated after cranking (S54). In this process, it is determined whether the above-described predetermined period, during which the amount of air filling the combustion chamber 24 cannot be obtained accurately, has elapsed since the starter motor 36 was activated.

When determining that the intake air amount Ga can be calculated (S54: YES), the CPU 52 determines whether the current time is a restart time of the internal combustion engine 10 (S56). In the restart time, when the IG signal is activated, an automatic stopping process (idling stopping process) of the internal combustion engine 10 is performed to stop the internal combustion engine 10 and then an automatic starting process of the internal combustion engine 10 is performed. When determining that the current time is the restart time of the internal combustion engine 10 (S56: YES), the CPU 52 substitutes the current water temperature THW into a restart-time water temperature THW1 (S58).

Then, the CPU 52 obtains the stop time Tstp as the time elapsed from the internal combustion engine 10 was automatically stopped to the current time (S60).

When completing the process of S60 and making a negative determination in the process of S56, the CPU 52 updates a total integration air amount InG0, which is an integration value of the intake air amount from when the starter motor 36 was activated (S62). The total integration air amount InG0 simply needs to be updated using the value obtained by adding the intake air amount Ga to a value of the total integration air amount InG0 in the previous process of S62. The initial value of the total integration air amount InG0 is 0. Further, when restarting has already been performed, the CPU 52 updates a post-restart integration air amount InG1, which is an integration value of the intake air amount Ga from when restarting was performed. The initial value of the post-restart integration air amount InG1 is 0.

The post-restart integration air amount InG1 is initialized every time, restarting is performed.

When completing the process of S62 or when making a negative determination in the process of S54, the CPU 52 proceeds to the process of S64. In the process of S64, the CPU 52 determines whether the logical conjunction of condition (i), in which the total integration air amount InG0 is greater than or equal to a determination value Inth0, a condition (ii), in which the post-restart integration air amount InG1 is greater than or equal to a determination value Inth1, and a condition (iii), in which the current water temperature THW is greater than or equal to the predetermined temperature Tth, is true. This process determines whether the temperature of the intake system including, for example, the intake passage 12 and the intake valve 18 is greater than or equal to a given temperature. The given temperature is set to a value at which PN is within an allowable range even if the single injection process is executed. It is desired that the predetermined temperature Tth be set to be greater than or equal to the given temperature.

The CPU 52 calculates the determination value Inth0 to be larger when the initial water temperature THW0 is low than when the initial water temperature THW0 is high. This simply needs to be achieved by the CPU 52, for example, performing map calculation for the determination value Inth0 in a state in which the ROM 54 stores in advance map data including the initial water temperature THW0 as an input variable and the determination value Inth0 as an output variable. The CPU 52 calculates the determination value Inth1 to be larger when the restart-time water temperature THW1 is high than when the restart-time water temperature THW1 is low. The CPU 52 calculates the determination value Inth1 to be larger when the stop time Tstp is long than when the stop time Tstp is short. This simply needs to be achieved by the CPU 52, for example, performing map calculation for the determination value Inth1 in a state in which the ROM 54 stores in advance map data including the restart-time water temperature THW1 and the stop time Tstp as input variables and the determination value Inth1 as an output variable. When the internal combustion engine 10 has not been restarted, the CPU 52 sets the determination value Inth1 to zero. Thus, when the internal combustion engine 10 is not being currently restarted, the above-described condition (ii) is automatically satisfied.

When determining that the logical conjunction of conditions (i) to (iii) is true (S64: YES), the CPU 52 selects the single injection process (S66). When determining that the logical conjunction of conditions (i) to (iii) is false (S64: NO), the CPU 52 determines whether the water temperature THW is greater than or equal to a low threshold value TL, which is lower than the predetermined temperature Tth (S68). The low threshold value TL is used to determine whether the time interval between the injection end timing of the intake asynchronous injection and the injection start timing Is of the intake synchronous injection can be set to be greater than or equal to the predetermined time when the requested injection amount Qd is excessively large because the water temperature THW is low. When making a negative determination in the process of S68, the CPU 52 determines that it is difficult to execute the multiple injection process and proceeds to the process of S66. When determining that the water temperature THW is greater than or equal to the low threshold value TL (S68: YES), the CPU 52 selects the multiple injection process (S70). This indicates that the multiple injection request has been made.

When completing the process of step S66 or S70, the CPU 52 temporarily ends the series of processes shown in FIG. 6.

The operation and advantages of the present embodiment will now be described.

When the initial water temperature THW0 is switched from off to on, the CPU 52 stores the present water temperature THW as the initial water temperature THW0. Further, when a request for executing the automatic starting process after the automatic stopping process is made, the CPU 52 sets the present water temperature THW as the restart-time water temperature THW1. The CPU 52 activates the starter motor 36 and then starts injecting fuel. In the predetermined period after the starter motor 36 was activated, the requested injection amount Qd is determined in accordance with the water temperature THW. The determination value Inth0 is set to zero when the initial water temperature THW0 is greater than or equal to a high threshold value, which is higher than the predetermined temperature Tth. Further, the determination value Inth1 is set to zero when the restart-time water temperature THW1 is greater than or equal to the high threshold value. Thus, the CPU 52 executes the single injection process in a case in which the water temperature THW when the starter motor 36 is activated is greater than or equal to the high threshold value, and the CPU 52 executes the multiple injection process in a case in which the water temperature THW is less than the high threshold value.

Then, in a case in which the predetermined period has elapsed after the starter motor 36 was started, when the water temperature THW is greater than or equal to the predetermined temperature Tth and the total integration air amount InG0 and the post-restart integration air amount InG1 are respectively greater than or equal to the determination value Inth0 and the determination value Inth1, the CPU 52 executes the single injection process because there is no need to execute the multiple injection process in terms of the reduction of PN. In some cases, even if the water temperature THW is greater than or equal to the predetermined temperature Tth, the total integration air amount InG0 may be less than the determination value Inth0 and the post-restart integration air amount InG1 may be less than the determination value Inth1. In such a case, the temperature of the intake valve 18 may be less than the given temperature. This is because the intake valve 18 directly receives the heat in the combustion chamber 24 and thus the temperature of the intake valve 18 is greatly dependent on the amount of heat generated in the combustion chamber 24, thereby preventing the temperature of the intake valve 18 from being unambiguously determined by the water temperature THW. Thus, when the total integration air amount InG0 is less than the determination value Inth0 and the post-restart integration air amount InG1 is less than the determination value Inth1, the temperature of the intake valve 18 may still not be sufficiently high although the water temperature THW is high. If the predetermined temperature Tth, which is the determination value of the water temperature THW, is set to a value in which the temperature of the intake valve 18 or the like is greater than or equal to the given temperature, the above-described conditions (i) and (ii) do not need to be set. However, in this case, the predetermined temperature Tth has to be set to an excessively large value. That is, even in a case in which PN can be set to be within the allowable range when the injection process is changed to the single injection process, the multiple injection process is executed.

In the present embodiment, the above-described conditions (i) and (ii) are set. Thus, as compared to when it is determined the request for executing the multiple injection process has been made only from the above-described condition (iii), the predetermined temperature Tth can be set to a small value in the present embodiment. Thus, when PN can be set to be within the allowable range, the single injection process can be executed as much as possible. This limits an increase in the number of times the port injection valve 16 is driven and limits a decrease in the durability of the port injection valve 16. Additionally, as compared to the multiple injection process, the single injection process can enhance atomization of fuel and limits the generation of HC.

Correspondence

The correspondence between the items in the above embodiments and the items described in the above-described SUMMARY is as follows. In the following description, the correspondence is shown for each of the numbers in the examples described in the SUMMARY.

[1] The multiple injection process corresponds to the process illustrated in section (a) of FIG. 3, and the single injection process corresponds to the process illustrated in section (b) of FIG. 3.

The selection process corresponds to the process of FIG. 6, and the operation process corresponds to the processes of S22 and S48.

[2] The determination process corresponds to the process of S64, and the requested injection amount calculation process corresponds to the base injection amount calculation process M20, the feedback process M22, and the low-temperature correction process M24. That is, when the requested injection amount Qd is Qb·KAF·Kw, when the base injection amount Qb, the feedback correction coefficient KAF, and the low-temperature increase coefficient Kw are calculated with the above-described processes, the requested injection amount Qd is calculated.

[3] The first determination value varying process corresponds to setting the determination value Inth0 and the determination value Inth1 in accordance with the water temperature in the process of S64.

[4] The second determination value varying process corresponds to setting the determination value Inth1 in accordance with the stop time Tstp in the process of S64.

[5] The determination process corresponds to the process of S64.

Modifications

The present embodiment may be modified as follows. The present embodiment and the following modifications may be implemented in combination with each other as long as technical contradiction does not occur.

Requested Injection Amount (a) Within Predetermined Period after Starter is Turned on In the above-described embodiment, the requested injection amount Qd is calculated based on the water temperature THW, the number of injections, and the stop time Tstp. Instead, for example, among the three parameters, the requested injection amount Qd may be calculated based only on the water temperature THW, calculated based only on the water temperature THW and the number of injections, and calculated based only on the water temperature THW and the stop time Tstp.

(b) After Elapse of Predetermined Period after Starter is Turned on

The requested injection amount Qd may be obtained by correcting the base injection amount Qb with a learning value LAF in addition to the low-temperature increase coefficient Kw and the feedback correction coefficient KAF. The process for calculating the learning value LAF is a process for updating the learning value LAF so as to reduce the correction factor of the base injection amount Qb using the feedback correction coefficient KAF as an input. It is desired that the learning value LAF be stored in an electrically rewritable non-volatile memory.

Further, for example, feedforward control based on the ratio of a disturbing fuel may be used to calculate the requested injection amount Qd such that the requested injection amount Qd is smaller when the ratio of the disturbing fuel is large than when the ratio is small. The ratio of the disturbing fuel refers to the ratio of fuel (disturbing fuel) other than the fuel injected from the port injection valve 16 in a single combustion cycle to the amount of fuel flowing into the combustion chamber 24 in a single combustion cycle. For example, when the internal combustion engine includes a canister that captures fuel vapor from a fuel tank storing fuel to be injected from the port injection valve 16 and includes an adjustment device that adjusts the amount of fluid in the canister flowing into the intake passage 12, the above-described disturbing fuel includes fuel vapor flowing into the canister to the intake passage 12. Additionally, for example, when the internal combustion engine includes a system that returns fuel vapor in the crankcase to the intake passage 12, the disturbing fuel includes fuel vapor flowing from the crankcase into the intake passage 12.

Intake Asynchronous Injection in Multiple Injection Process

In the above-described embodiment, the intake asynchronous injection is used to inject fuel such that the period in which the fuel injected from the port injection valve 16 reaches the position of the intake valve 18 prior to opening is within the closed period of the intake valve 18. Instead, when the rotation speed NE is high and the asynchronous injection amount Qns is excessively large, part of the period in which the fuel injected from the port injection valve 16 reaches the position of the intake valve 18 prior to opening may overlap the open period of the intake valve 18.

Intake Synchronous Injection (a) Within Predetermined Period after Starter is Turned on In the above-described embodiment, the injection start timing Is is set based on the water temperature THW, the rotation speed NE, and the intake phase difference DIN. For example, only one or two of the three parameters may be used to set the injection start timing Is.

(b) After Elapse of Predetermined Period after Starter is Turned on

In the above-described embodiment, the reach end timing AEs is set based on the rotation speed NE, the charging efficiency η, the water temperature THW, and the intake phase difference DIN. Instead, for example, the injection start timing Is may be directly set based on the rotation speed NE, the charging efficiency η, the water temperature THW, and the intake phase difference DIN. Additionally, for example, the base injection amount Qb may be used instead of the charging efficiency η as a parameter that indicates load, which is a parameter indicating the amount of fresh air filling the combustion chamber 24. Further, the reach end timing AEs and the injection start timing Is may be variably set based on only three, two, or one of the four parameters, namely, the rotation speed NE, the load, the water temperature THW, and the intake phase difference DIN.

Single Injection Process

In the above-described embodiment, the single injection process is used as a process for injecting fuel such that the period in which the fuel injected from the port injection valve 16 reaches the position of the intake valve 18 prior to opening is within the closed period of the intake valve 18. Instead, when the requested injection amount Qd is large, part of the period in which the fuel injected from the port injection valve 16 reaches the position of the intake valve 18 prior to opening may overlap the closed period of the intake valve 18.

Determination Process

In the above-described embodiment, it is determined that the temperature of the intake system is greater than or equal to the given temperature when the logical conjunction of the above-described conditions (i), (ii), and (iii) is true. Instead, it may be determined that the temperature of the intake system is greater than or equal to the given temperature when, for example, the logical conjunction of another condition (iv) and condition (iii) is true. Condition (iv) is that the post-restart integration air amount InG1 in the above-described condition (ii) is set as an integration value of the intake air amount Ga from an immediately-preceding start regardless of whether it is a restart and the determination value Inth1 is variably set based on the water temperature THW at the immediately-preceding start and the time elapsed from an immediately-preceding stop to the immediately-preceding start. Further, it may be determined that the temperature of the intake system is greater than or equal to the given temperature when, for example, condition (iv) is satisfied.

In the above-described embodiment, it is assumed that an idling stop control is executed in a vehicle including only an internal combustion engine as a prime mover that generates the thrust of the vehicle. Instead, for example, the prime mover that generates the thrust of the vehicle may be a hybrid vehicle that includes a rotating electrical machine in addition to the internal combustion engine. In this case, when the logical conjunction of condition (iv) and condition (iii) is true, it may be determined that the temperature of the intake system is greater than or equal to the given temperature. Alternatively, when the logical conjunction of condition (i), condition (ii), and condition (iii) is true, it may be determined that the temperature of the intake system is greater than or equal to the given temperature. Here, condition (i) is that the integration value of the intake air amount Ga is set as the total integration air amount InG0 after a signal that enables the vehicle to travel is switched from off to on. Condition (ii) is that the integration value of the intake air amount Ga is set as the post-restart integration air amount InG1 from the second or subsequent start time after the signal that enables the vehicle to travel is switched from off to on.

Instead, in a case in which the idling stop control is not executed, it may be determined that the temperature of the intake system is greater than or equal to the given temperature when the logical conjunction of condition (i) and condition (iii) is true. In a further modification, it may be determined that the temperature of the intake system is greater than or equal to the given temperature when condition (i) is satisfied. As another option, for example, it may be determined that the temperature of the intake system is greater than or equal to the given temperature when condition (iii) is satisfied.

For example, when an alcohol concentration such as the detection value of an alcohol concentration sensor that detects the alcohol concentration in fuel can be obtained, the determination value Inth0 and the determination value Inth1 may be variably set in accordance with the alcohol concentration. In this case, the determination value Inth0 and the determination value Inth1 are set to be larger when the alcohol concentration is high than when the alcohol concentration is low.

Selection Process

The conditions for selecting the multiple injection process is not limited to those exemplified in the above-described embodiment. For example, the following conditions (v) and (vi) may be set.

Condition (v): the charging efficiency $\eta$ is greater than or equal to a predetermined value. This condition is that when the single injection process is performed, the amount of fuel collecting on the intake passage 12 is excessively large and PN is thus remarkable. This condition is applied after the predetermined period has elapsed after the starter was turned on.

Condition (vi): the rotation speed NE is less than or equal to a predetermined speed NEth. This condition is that the time interval between the end timing of the intake asynchronous injection and the injection start timing Is of the intake synchronous injection can be set to be greater than or equal to the predetermined time. Further, this condition is that since the multiple injection process produces a larger load than the single injection process, an increase in the calculation load of the control device 50 prevents the heat-generation amount from becoming excessively large.

Division of Requested Injection Amount (a) Within Predetermined Period after Starter is Turned on In the above-described embodiment, since the sum of the asynchronous injection amount Qns calculated in the process of S14 and the synchronous injection amount Qs calculated in the process of S16 is the requested injection amount Qd, the process of dividing the requested injection amount Qd into the synchronous injection amount Qs and the asynchronous injection amount Qns is executed through the processes of S14 and S16. Instead of the process of S16, for example, the synchronous injection amount Qs may be calculated in accordance with the number of injections and the stop time Tstp in addition to the water temperature THW.

(b) After Elapse of Predetermined Period after Starter is Turned on

In the above-described embodiment, the synchronous injection amount Qs, which indicates the ratio of the synchronous injection amount Qs in the base injection amount Qb, is set based on the rotation speed NE, the charging efficiency $\eta$, the water temperature THW, and the intake phase difference DIN. Instead, for example, the requested injection amount Qd may be used instead of the charging efficiency $\eta$ as a load parameter that indicates the amount of fresh air filling the combustion chamber 24. Further, the synchronous injection ratio Ks may be variably set based on only three, two, or one of the four parameters, namely, the load parameter, the rotation speed NE, the water temperature THW, and the intake phase difference DIN. It is desired that the synchronous injection ratio Ks be variably set using at least one of the load parameter and the water temperature THW as much as possible. Alternatively, other than the four parameters, the intake pressure and the flow speed of intake air may be used. The four parameters allow the intake pressure and the flow speed of intake air to be obtained.

Determining the synchronous injection ratio Ks is not required. For example, in the above-described embodiment and its modification, the synchronous injection amount Qs may be calculated based on a parameter that determines the synchronous injection ratio Ks. In this case, the asynchronous injection amount Qns simply needs to be Qb·KAF·Kw−Qs.

The synchronous injection amount Qs may be, for example, a value obtained by dividing, using the synchronous injection ratio Ks, the value (KAF·Qb) obtained by correcting the base injection amount Qb by the feedback correction coefficient KAF. In this case, the synchronous injection amount Qs is Ks·KAF·Qb.

Characteristic Varying Device for Intake Valve

The characteristic varying device that changes the characteristics of the intake valve 18 is not limited to the intake valve timing adjustment device 44. For example, the characteristic varying device may be a device that changes a lift amount. In this case, the parameter indicating the valve characteristics of the intake valve 18 is the lift amount or the like instead of the intake phase difference DIN. Thus, in the above-described embodiment and its modification, the lift amount or the like simply needs to be used instead of the intake phase difference DIN.

Control Device

The control device is not limited to a device that includes the CPU 52 and the ROM 54 and executes software processing. For example, at least part of the processes executed by the software in the above-illustrated embodiment may be executed by hardware circuits dedicated to executing these processes (such as ASIC). That is, the control device may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Others

The internal combustion engine 10 does not need to include the characteristic varying device that changes the characteristics of the intake valve 18. The internal combustion engine 10 does not need to include the throttle valve 14.

Second Embodiment

The control device for the internal combustion engine according to a second embodiment will now be described with reference to FIGS. 7 to 12.

Figure 7:
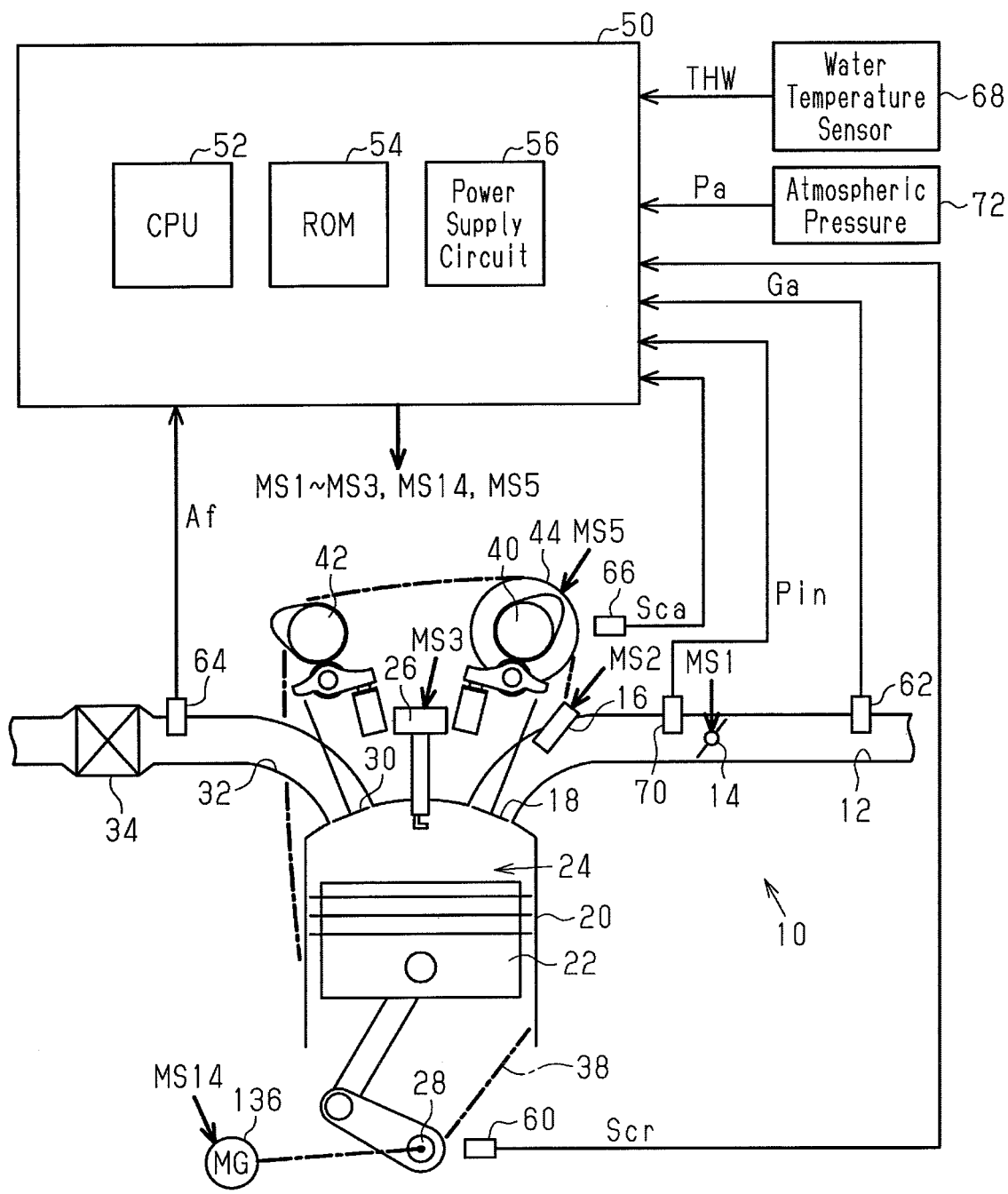
FIG. 7 is a diagram showing a control device and an internal combustion engine according to a second embodiment of the present disclosure.

As shown in FIG. 7, the internal combustion engine 10 includes the intake passage 12. The intake passage 12 includes, sequentially from the upstream side, the throttle valve 14 and the port injection valve 16. The air drawn into the intake passage 12 and the fuel injected from the port injection valve 16 flow into the combustion chamber 24, which is defined by the cylinder 20 and the piston 22, as the intake valve 18 opens. The air-fuel mixture of fuel and air drawn into the combustion chamber 24 is burned by the spark discharge of an ignition device 26. The energy generated through the combustion is converted into rotation energy of the crankshaft 28 by the piston 22. The burned air-fuel mixture is discharged to the exhaust passage 32 as exhaust gas when the exhaust valve 30 opens. The exhaust passage 32 is provided with the catalyst 34.

The rotation power of the crankshaft 28 is transmitted through the timing chain 38 to the intake camshaft 40 and the exhaust camshaft 42. In the present embodiment, the power of the timing chain 38 is transmitted to the intake camshaft 40 through the intake valve timing adjustment device 44. The intake valve timing adjustment device 44 is an actuator that adjusts the valve-opening timing of the intake valve 18 by adjusting the rotation phase difference between the crankshaft 28 and the intake camshaft 40.

A motor generator 136, which generates the thrust of the vehicle together with the internal combustion engine 10, is mechanically coupled to the crankshaft 28. That is, the vehicle according to the present embodiment is a hybrid vehicle that includes the internal combustion engine 10 and the motor generator 136 as thrust generators of the vehicle.

The control device 50 controls the internal combustion engine 10. In order to control the control amount (for example, torque or exhaust component ratio) of the internal combustion engine 10, the control device 50 operates operation units of the internal combustion engine 10 such as the throttle valve 14, the port injection valve 16, the ignition device 26, and the intake valve timing adjustment device 44. The control device 50 refers to the output signal Scr of the crank angle sensor 60, the intake air amount Ga, which is detected by the airflow meter 62, and the downstream pressure (intake pressure Pin) of the throttle valve 14 in the pressure in the intake passage 12 detected by an intake pressure sensor 70. Further, the control device 50 refers to the air-fuel ratio Af, which is detected by the air-fuel ratio sensor 64, the output signal Sca of the intake cam angle sensor 66, the temperature (water temperature THW) of coolant in the internal combustion engine 10 detected by the water temperature sensor 68, and an atmospheric pressure Pa, which is detected by an atmospheric pressure sensor 72.

The control target of the control device 50 is the motor generator 136. The control device 50 controls a control amount (for example, torque or rotation speed) of the motor generator 136. FIG. 7 shows the operation signals MS1 to MS3, an operation signal MS14, and the operation signal MS5, which are respectively used to operate the throttle valve 14, the port injection valve 16, the ignition device 26, the motor generator 136, and the intake valve timing adjustment device 44.

The control device 50 includes the CPU 52, the ROM 54, and the power supply circuit 56 and controls the above-described control amount by the CPU 52 executing programs stored in the ROM 54. The power supply circuit 56 supplies power to each part in the control device 50.

Figure 8:
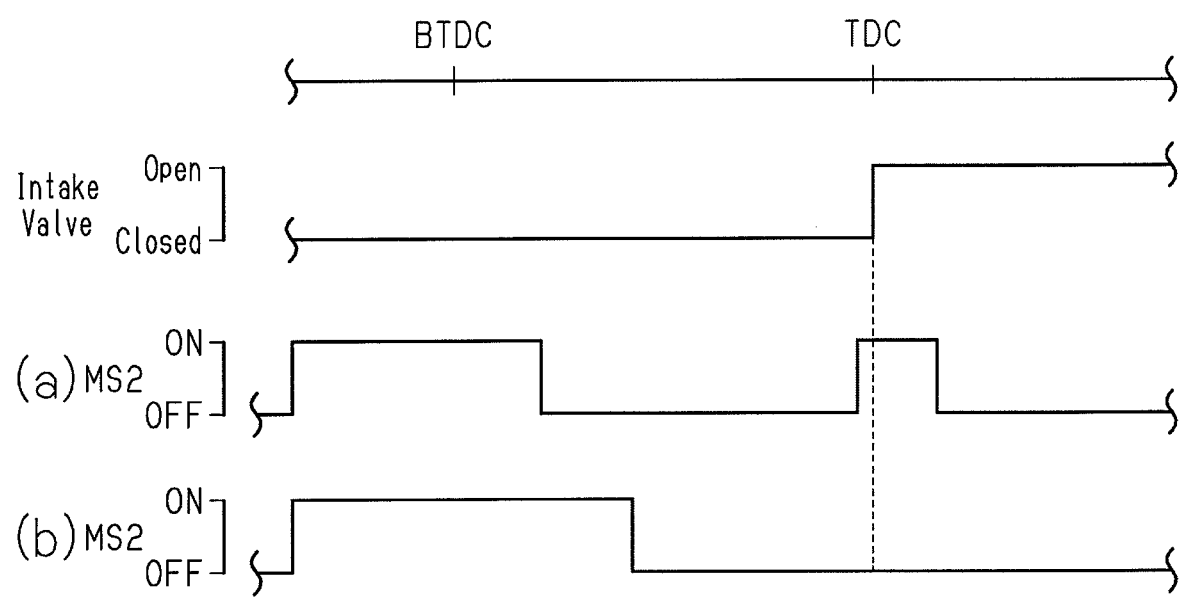
FIG. 8 shows injection patterns in the internal combustion engine of FIG. 7, including section (a) and section (b).

In the present embodiment, there are two types of fuel injection processes, namely, a process illustrated in section (a) of FIG. 8 and a process illustrated in section (b) of FIG. 8.

Section (a) of FIG. 8 illustrates the intake synchronous injection, which injects fuel in synchronization with the open period of the intake valve 18, and the intake asynchronous injection, which injects fuel at a point in time advanced with respect to the intake synchronous injection. More specifically, the intake synchronous injection is to inject fuel such that the period in which the fuel injected from the port injection valve 16 reaches the position of the intake valve 18 prior to opening (the downstream end of the intake port, i.e., the inlet of the combustion chamber 24) is within the open period of the intake valve 18. The starting point of the fuel-reaching period is the point in time at which the fuel injected at the earliest point in time in the fuel injected from the port injection valve 16 reaches the position of the intake valve 18 prior to opening. The end point of the fuel-reaching period is the point in time at which the fuel injected at the latest point in time in the fuel injected from the port injection valve 16 reaches the position of the intake valve 18 prior to opening. The intake asynchronous injection is to inject fuel such that the fuel injected from the port injection valve 16 reaches the intake valve 18 before the intake valve 18 opens. In other words, in the intake asynchronous injection, the fuel injected from the port injection valve 16 remains in the intake passage 12 until the intake valve 18 opens and flows into the combustion chamber 24 after the intake valve 18 opens. In the present embodiment, in the intake asynchronous injection, fuel is injected such that the period in which the fuel injected from the port injection valve 16 reaches the position of the intake valve 18 prior to opening is within the closed period of the intake valve 18.

Section (b) of FIG. 8 illustrates the single injection process for executing only the intake asynchronous injection.

In the present embodiment, the multiple injection process is executed with the intention of reducing the number (PN) of particulate matter (PM) in exhaust gas. That is, in a case in which the temperature of the intake system of the internal combustion engine 10 such as the intake passage 12 and the intake valve 18 is low to a certain extent, PN tends to increase when the single injection process is executed. This is because when the temperature of the intake system is low, the requested injection amount, which is the amount of fuel that should be injected from the port injection valve 16, is large and thus the amount of fuel collecting on the intake system is large. More specifically, when the amount of fuel collecting on the intake system increases to a certain extent, shearing the collected fuel presumably causes some of the collected fuel to flow into the combustion chamber 24 in a state in which they remain droplets. In the present embodiment, even when the requested injection amount is large, injecting some of the requested injection amount with the intake synchronous injection reduces the amount of fuel collecting on the intake system considering the large amount of the requested injection amount, thereby consequently reducing PN.

Figure 9:
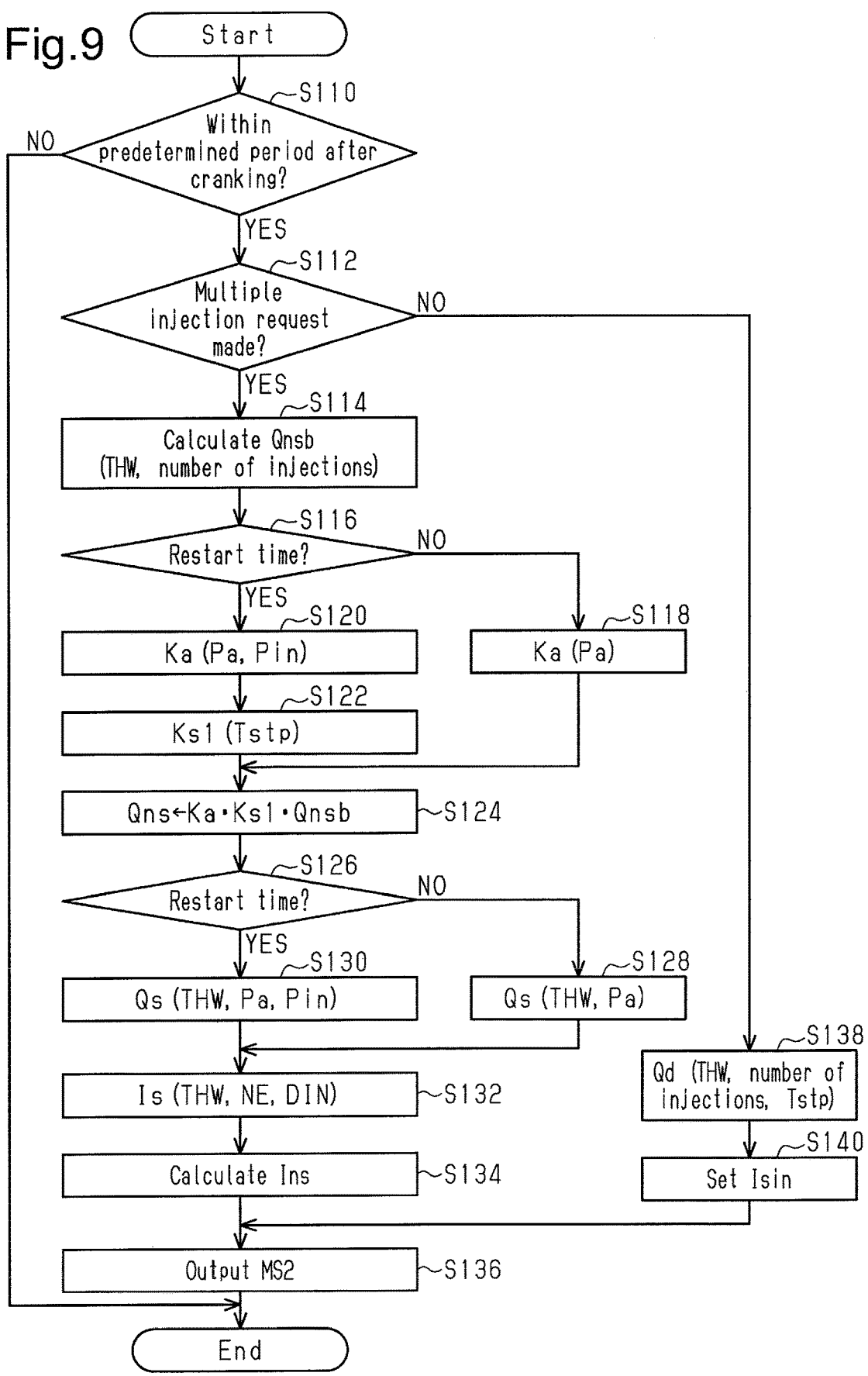
FIG. 9 is a flowchart illustrating a procedure for processes executed by the control device in the internal combustion engine of FIG. 7.

FIG. 9 shows a procedure for processes when the internal combustion engine 10 is started. The processes shown in FIG. 9 are executed by the CPU 52 repeatedly executing programs stored in the ROM 54 at a predetermined interval. In the following description, the number of each step is represented by the letter S followed by a numeral.

In the series of processes shown in FIG. 9, the CPU 52 first determines whether the current time is within a predetermined period after cranking was started (S110). The predetermined period refers to a period in which the amount of air filling the combustion chamber 24 cannot be obtained precisely depending on the intake air amount Ga detected by the airflow meter 62 and thus the base injection amount Qb cannot be calculated precisely based on the intake air amount Ga. When determining that the current time is within the predetermined period after cranking was started (S110: YES), the CPU 52 determines whether the request for the multiple injection process has been made (S112). When determining that the request for the multiple injection process has been made (S112: YES), the CPU 52 calculates an asynchronous base injection amount Qnsb, which is a base value of the injection amount of the intake asynchronous injection, based on the water temperature THW and the number of injections after cranking was started (S114). The CPU 52 calculates the asynchronous base injection amount Qnsb to be larger when the water temperature THW is low than when the water temperature THW is high. This process can be achieved by the CPU 52 performing map calculation for the asynchronous base injection amount Qnsb in a state in which the ROM 54 stores in advance map data that includes the water temperature THW and the number of injections as input variables and includes the asynchronous base injection amount Qnsb as an output variable. The map data refers to a data set of discrete values of input variables and values of output variables each corresponding to a value of the input variables. When the value of an input variable matches any of the values of the input variable on the map data, the map calculation uses the value of the corresponding output variable on the map data as the calculation result. When the value of the input variable does not match any of the values of the input variable on the map data, the map calculation uses a value obtained by interpolation of multiple values of the output variable included in the map data set as the calculation result.

Figure 10A:
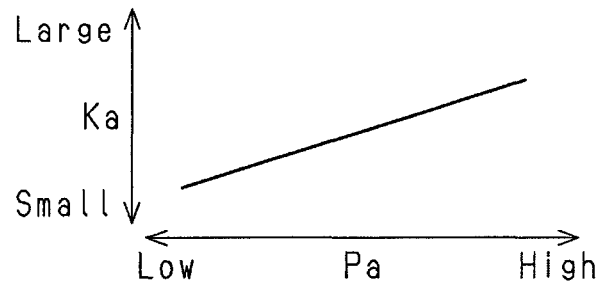
FIG. 10A is a graph showing the relationship between the atmospheric pressure and a pressure correction coefficient in the internal combustion engine of FIG. 7.

Next, the CPU 52 determines whether the current time is a restart time of the internal combustion engine 10 (S116). The restart time of the internal combustion engine 10 refers to a start time of the internal combustion engine 10 after the second time during a period from when the activation switch of the vehicle is turned on to when the activation switch is turned off. The activation switch of the vehicle refers to a switch for enabling the vehicle to travel by a user releasing the brake and operating the accelerator. When determining that the current time is not the restart time of the internal combustion engine 10 (S116: NO), the CPU 52 calculates a pressure correction coefficient Ka, which is a correction coefficient of the asynchronous base injection amount Qnsb, in accordance with the atmospheric pressure Pa (S118). More specifically, as shown in FIG. 10A, the pressure correction coefficient Ka is calculated to be larger when the atmospheric pressure Pa ig high than when the atmospheric pressure Pa is low. This is because the amount of air filling the combustion chamber 24 is large since the pressure in the intake passage 12 at the start time is higher when the atmospheric pressure Pa is high than when the atmospheric pressure Pa is low. That is, the asynchronous injection amount Qns, which is an injection amount of the intake asynchronous injection, is set to be larger when the amount of air filling the combustion chamber 24 is large than when the amount is small because of the high atmospheric pressure Pa. Thus, even when the atmospheric pressure Pa is high, the air-fuel ratio of air-fuel mixture subject to combustion in the combustion chamber 24 is prevented from becoming excessively lean. This process is achieved by the CPU 52 performing map calculation for the pressure correction coefficient Ka in a state in which the ROM 54 stores in advance map data including the atmospheric pressure Pa as an input variable and the pressure correction coefficient Ka as an output variable.

Figure 10B:
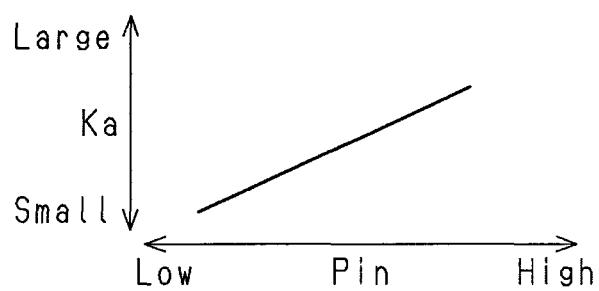
FIG. 10B is a graph showing the relationship between the intake pressure and the pressure correction coefficient in the internal combustion engine of FIG. 7.

Referring back to FIG. 9, when determining that the current time is the restart time of the internal combustion engine 10 (S116: YES), the CPU 52 variably sets the pressure correction coefficient Ka in accordance with the atmospheric pressure Pa and the intake pressure Pin (S120). In the same manner as when the current time is not the restart time, the CPU 52 calculates the pressure correction coefficient Ka to be larger when the atmospheric pressure Pa is high than when the atmospheric pressure Pa is low. Further, as shown in FIG. 10B, the CPU 52 calculates the pressure correction coefficient Ka to be smaller when the intake pressure Pin is low than when the intake pressure Pin is high. This is because when the pressure in the intake passage 12 is still lower than the atmospheric pressure Pa at the restart time of the internal combustion engine 10, the vapor pressure of fuel in the intake passage 12 is lower than when the pressure in the intake passage 12 is the atmospheric pressure Pa, thereby facilitating the atomization of fuel. That is, when fuel is easily atomized, the amount of fuel that remains in the intake system of the internal combustion engine 10 without flowing into the combustion chamber 24 in the fuel injected from the port injection valve 16 tends to be smaller than when, for example, the pressure in the intake passage 12 converges to the atmospheric pressure immediately before the restart. Thus, if the same amount of fuel is injected when the intake pressure Pin is low as when the intake pressure Pin is high, the air-fuel ratio of air-fuel mixture subject to combustion in the combustion chamber 24 may be excessively rich. This process is achieved by the CPU 52 performing map calculation for the pressure correction coefficient Ka in a state in which the ROM 54 stores in advance map data including the atmospheric pressure Pa and the intake pressure Pin as input variables and the pressure correction coefficient Ka as an output variable.

Figure 11:
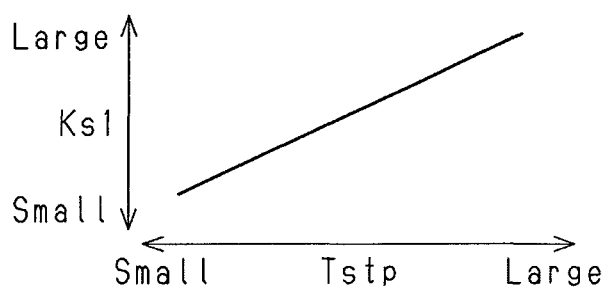
FIG. 11 is a graph showing the relationship between a stop time and a stop time correction coefficient in the internal combustion engine of FIG. 7.

Referring back to FIG. 9, when completing the process of S120, the CPU 52 calculates a stop time correction coefficient Ks1 for the asynchronous base injection amount Qnsb based on the stop time Tstp of the internal combustion engine 10, which is the time elapsed from when the internal combustion engine 10 was previously stopped to when the internal combustion engine 10 is currently started (S122). More specifically, as shown in FIG. 11, the CPU 52 calculates the stop time correction coefficient Ks1 to be larger when the stop time Tstp is long than when the stop time Tstp is short. That is, this process is a process for calculating the asynchronous injection amount QnS to be a smaller value when the elapsed time (Tstp) from when the internal combustion engine is stopped to when the internal combustion engine is started. This process is achieved by the CPU 52 performing map calculation for the stop time correction coefficient Ks1 in a state in which the ROM 54 stores in advance map data including the stop time Tstp as an input variable and the stop time correction coefficient Ks1 as an output variable.

Referring back to FIG. 9, when completing the process of S122 or S118, the CPU 52 substitutes, into the asynchronous injection amount Qns, a value obtained by multiplying the asynchronous base injection amount Qnsb by the pressure correction coefficient Ka and the stop time correction coefficient Ks1 (S124).

Subsequently, the CPU 52 determines whether the current time is the restart time of the internal combustion engine 10 (S126). When determining that the current time is not the restart time of the internal combustion engine 10 (S126: NO), the CPU 52 calculates the synchronous injection amount Qs, which is an injection amount of the intake synchronous injection, based on the water temperature THW and the atmospheric pressure Pa (S128). When determining that the current time is the restart time of the internal combustion engine 10 (S126: YES), the CPU 52 calculates the synchronous injection amount Qs based on the water temperature THW, the atmospheric pressure Pa, and the intake pressure Pin (S130). In the processes of S128 and S130, the water temperature THW, the atmospheric pressure Pa, and the intake pressure Pin are used for the same reason as when the asynchronous injection amount Qns is calculated.

The sum of the asynchronous injection amount Qns and the synchronous injection amount Qs is the requested injection amount in a single combustion cycle. Thus, the processes of S114 to S130 are processes for dividing the requested injection amount into the asynchronous injection amount Qns and the synchronous injection amount Qs.

When completing the process of S128 or S130, the CPU 52 uses the water temperature THW, the rotation speed NE, and the intake phase difference DIN to calculate the injection start timing Is of the intake synchronous injection (S132). This is a process for performing map calculation for the injection start timing Is using the CPU 52 in a state in which the ROM 54 stores in advance map data including the water temperature THW, the rotation speed NE, and the intake phase difference DIN as input variables and including the injection start timing Is as an output variable. The intake phase difference DIN is a phase difference of the rotation angle of the intake camshaft 40 relative to the rotation angle of the crankshaft 28. The intake phase difference DIN may be a fixed value at the start time. Even in this case, for example, when the fixed value of the intake phase difference DIN is different at the start time depending on the vehicle, it is effective to calculate the injection start timing Is in accordance with the intake phase difference DIN.

Then, the CPU 52 calculates the injection start timing Ins of the intake asynchronous injection such that the intake asynchronous injection ends before the injection start timing Is of the intake synchronous injection by the predetermined time or more (S134). The predetermined time is determined by the structure of the port injection valve 16. In two fuel injections adjacent to each other chronologically, namely, injection on the advanced side and injection on the retarded side, the injection on the retarded side is prevented from starting before the advanced-side injection ends by the predetermined time. The CPU 52 operates the port injection valve 16 by outputting the operation signal MS2 to the port injection valve 16 such that the fuel of the asynchronous injection amount Qns to be injected from the port injection valve 16 at the injection start timing Ins and the fuel of the synchronous injection amount Qs to be injected from the port injection valve 16 at the injection start timing Is (S136).

When determining that the request for executing the multiple injection process has not been made (S112: NO), the CPU 52 calculates the requested injection amount Qd, which is an injection amount requested in a single combustion cycle, based on the water temperature THW, the number of injections after cranking was started, and the stop time Tstp (S138). Subsequently, the CPU 52 sets the injection start timing Isin (S140). Then, the CPU 52 operates the port injection valve 16 by outputting the operation signal MS2 of the port injection valve 16 to cause the fuel of the requested injection amount Qd to be injected at the injection start timing Isin (S136).

Figure 12:
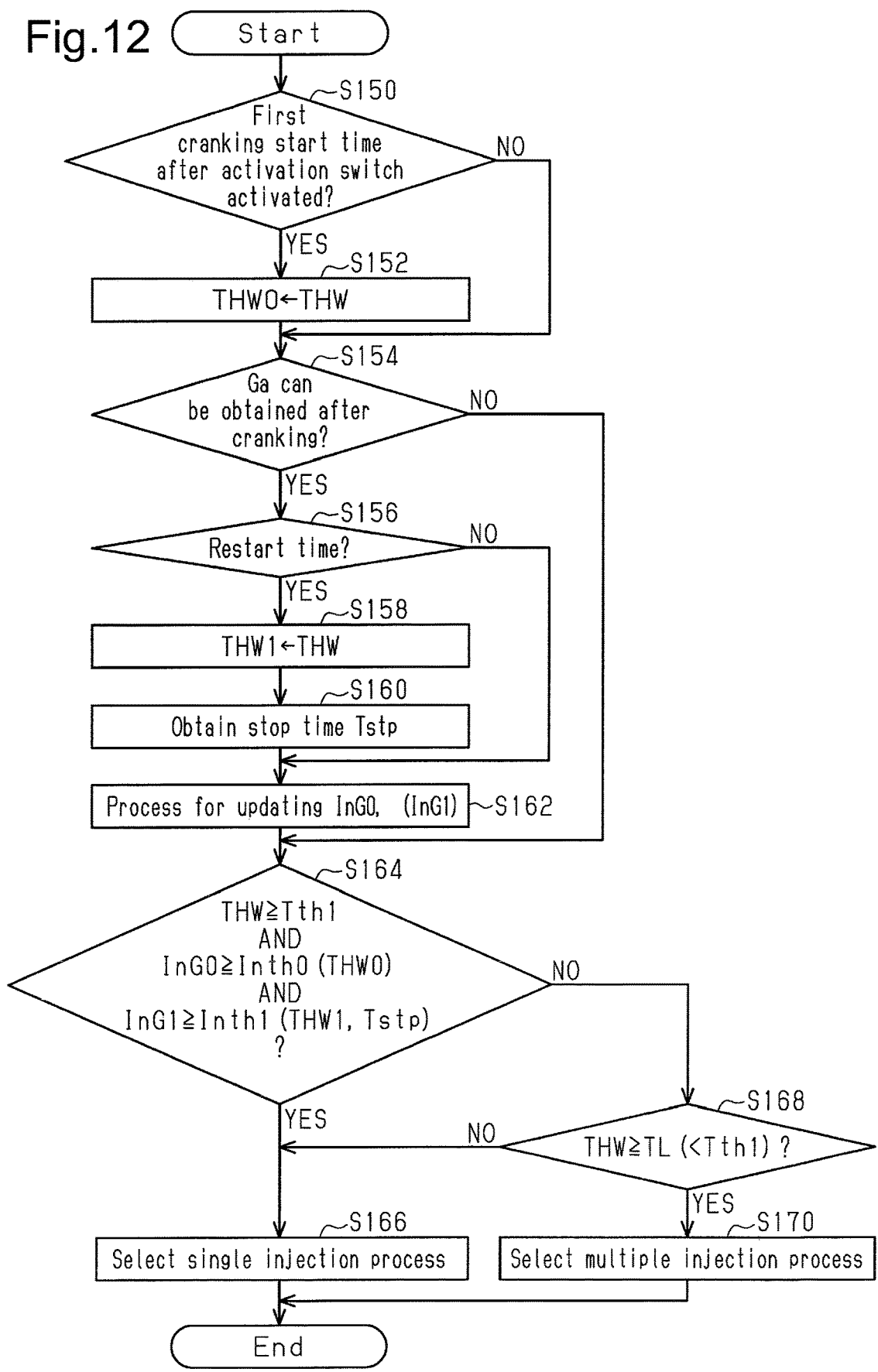
FIG. 12 is a flowchart illustrating a procedure for processes executed by the control device in the internal combustion engine of FIG. 7.

When completing the process of S136 or when making a negative determination in the process of S110, the CPU 52 temporarily ends the series of processes shown in FIG. 9. FIG. 12 illustrates a procedure for the determination of a request for executing the multiple injection process. The processes shown in FIG. 12 are executed by the CPU 52 repeatedly executing programs stored in the ROM 54 at a predetermined interval.

In a series of processes shown in FIG. 12, the CPU 52 first determines whether the current time is the first cranking start time after the activation switch of the vehicle was turned on (S150). When determining that the current time is the first cranking start time after the activation switch of the vehicle was turned on (S150: YES), the CPU 52 substitutes the current water temperature THW into the initial water temperature THW0 (S152). When completing the process of S152 and making a negative determination in the process of S150, the CPU 52 determines whether the intake air amount Ga, which is detected by the airflow meter 62, can be calculated as a value with which the requested injection amount Qd can be calculated precisely after cranking (S154). This process determines whether the above-described predetermined period, during which the amount of air filling the combustion chamber 24 cannot be obtained precisely by the airflow meter 62, has elapsed after cranking was started.

When determining that the intake air amount Ga, which is detected by the airflow meter 62, can be obtained as a value with which the requested injection amount Qd can be calculated precisely after cranking (S154: YES), the CPU 52 determines whether the current time is the restart time of the internal combustion engine 10 (S156). When determining that the current time is the restart time of the internal combustion engine 10 (S156: YES), the CPU 52 substitutes the current water temperature THW into the restart-time water temperature THW1 (S158).

Then, the CPU 52 obtains the stop time Tstp as the time elapsed from an immediately-preceding automatic stop time of the internal combustion engine 10 to the current time (S160).

When completing the process of S160 and making a negative determination in the process of S156, the CPU 52 updates the total integration air amount InG0, which is an integration value of the intake air amount from when the first cranking was started (S162). The total integration air amount InG0 simply needs to be updated using the value obtained by adding the intake air amount Ga to a value of the total integration air amount InG0 in the previous process of S162. The initial value of the total integration air amount InG0 is 0. Further, when restarting has already been performed, the CPU 52 updates the post-restart integration air amount InG1, which is an integration value of the intake air amount Ga from the restart time, in addition to the total integration air amount InG0. The initial value of the post-restart integration air amount InG1 is 0. The post-restart integration air amount InG1 is initialized every time restarting is performed.

When completing the process of S162 or when making a negative determination in the process of S154, the CPU 52 proceeds to the process of S164. In the process of S164, the CPU 52 determines whether the logical conjunction of condition (xi), in which the current water temperature THW is greater than or equal to a water given temperature Tth1, a condition (xii), in which the total integration air amount InG0 is greater than or equal to the determination value Inth0, and condition (xiii), in which the post-restart integration air amount InG1 is greater than or equal to the determination value Inth1, is true. This process is a process for determining whether the temperature of the intake system including, for example, the intake passage 12 and the intake valve 18 is greater than or equal to a lower limit value of the temperature in which the PN is in the allowable range even when the single injection process is executed.

The CPU 52 calculates the determination value Inth0 to be larger when the initial water temperature THW0 is low than when the initial water temperature THW0 is high. This simply needs to be achieved by the CPU 52, for example, performing map calculation for the determination value Inth0 in a state in which the ROM 54 stores in advance map data including the initial water temperature THW0 as an input variable and the determination value Inth0 as an output variable. The CPU 52 calculates the determination value Inth1 to be larger when the restart-time water temperature THW1 is low than when the restart-time water temperature THW1 is high. The CPU 52 calculates the determination value Inth1 to be larger when the stop time Tstp is long than when the stop time Tstp is short. This simply needs to be achieved by the CPU 52, for example, performing map calculation for the determination value Inth1 in a state in which the ROM 54 stores in advance map data including the restart-time water temperature THW1 and the stop time Tstp as input variables and the determination value Inth1 as an output variable. When the initial water temperature THW0 is greater than or equal to an initial predetermined temperature higher than the water given temperature Tth1, the determination value Inth0 is set to zero. Further, when the restart-time water temperature THW1 is greater than or equal to the initial predetermined temperature, the determination value Inth1 is set to zero. In addition, when the stop time Tstp is less than or equal to a given time, the determination value Inth1 is set to zero. When the internal combustion engine 10 has not been restarted, the CPU 52 sets the determination value Inth1 to zero. Thus, when the current time is not the restart time, the above-described condition (xiii) is automatically satisfied.

When determining that the logical conjunction of conditions (xi) to condition (xiii) is true (S164: YES), the CPU 52 selects the single injection process (S166). When determining that the logical conjunction of conditions (xi) to condition (xiii) is false (S164: NO), the CPU 52 determines whether the water temperature THW is greater than or equal to the low threshold value TL, which is lower than the water given temperature Tth1 (S168). The low threshold value TL is used to determine whether the time interval between the injection end timing of the intake asynchronous injection and the injection start timing Is of the intake synchronous injection can be set to be greater than or equal to the predetermined time when the requested injection amount Qd is excessively large because of the water temperature THW. When making a negative determination in the process of S168, the CPU 52 determines that it is difficult to execute the multiple injection process and proceeds to the process of S166. When determining that the water temperature THW is greater than or equal to the low threshold value TL (S168: YES), the CPU 52 selects the multiple injection process (S170). This indicates that the multiple injection request has been made.

When completing the processes of step S166 or S170, the CPU 52 temporarily ends a series of processes shown in FIG. 12.

In the present embodiment, even when making a negative determination the process of S110, the CPU 52 selects the multiple injection process or the single injection process based on the process of FIG. 12. When making a negative determination in the process of S110, the CPU 52 executes control to inject the fuel of the requested injection amount determined from the intake air amount Ga in accordance with the selection result.

The operation and advantages of the present embodiment will now be described.

To start the internal combustion engine 10, the CPU 52 selects the single injection process when the logical conjunction of the above-described conditions (xi) to (xiii) is true and selects the multiple injection process when the logical conjunction is false. At the first start time, the above-described condition (xii) is automatically satisfied. However, at the first start time, the total integration air amount InG0 cannot be calculated and is zero, which is the initial value. Thus, when the initial water temperature THW0 is not greater than or equal to the initial predetermined temperature, which is higher than the water given temperature Tth1, the CPU 52 selects the multiple injection process as long as the water temperature THW is less than the low threshold value TL. When the initial water temperature THW0 is greater than or equal to the initial predetermined temperature, the logical conjunction of the above-described conditions (xi) to (xiii) is true and thus the CPU 52 executes the single injection process.

Further, even during the restart time, as long as the stop time Tstp is excessively short, when the initial water temperature THW0 is not greater than or equal to the initial predetermined temperature, which is higher than the water given temperature Tth1, the CPU 52 selects the multiple injection process as long as the water temperature THW is less than the low threshold value TL.

At the restart time, when the stop time Tstp is excessively short, the determination value Inth1 is zero. Thus, in a case in which the water temperature THW is greater than or equal to the water given temperature Tth1 and the total integration air amount InG0 is greater than or equal to the determination value Inth0, the CPU 52 selects the single injection process. That is, in a case in which the total integration air amount InG0 is greater than or equal to the determination value Inth0 immediately before the internal combustion engine 10 is stopped, the CPU 52 selects the single injection process when the water temperature THW is greater than or equal to the water given temperature Tth1.

However, in some cases, even when the water temperature THW is greater than or equal to the water given temperature Tth1, the total integration air amount InG0 may be less than the determination value Inth0. In this case, the temperature of the intake valve 18 may not reach a temperature region that allows PN to be in the allowable range. This is because the intake valve 18 directly receives the heat in the combustion chamber 24 and thus the temperature of the intake valve 18 is greatly dependent on the amount of heat generated in the combustion chamber 24, thereby preventing the temperature of the intake valve 18 from being unambiguously determined by the water temperature THW. Thus, when the total integration air amount InG0 is less than the determination value Inth0, the temperature of the intake valve 18 is still not sufficiently high although the water temperature THW is high. If the water given temperature Tth1, which is the determination value of the water temperature THW, is set to a value in which the temperature of the intake valve 18 or the like is greater than or equal to the initial predetermined temperature, the above-described condition (xii) do not need to be set. However, in this case, the water given temperature Tth1 has to be set to be an excessively large value. Thus, even in a case in which PN can be set to the allowable range when the injection process is changed to the single injection process, the multiple injection process may be executed.

In the present embodiment, the above-described condition (xii) is set. Thus, as compared to when it is determined whether the request for executing the multiple injection process has been made only from the above-described condition (xi), the water given temperature Tth1 can be set to be a small value. Thus, when PN can be set to be within the allowable range, the single injection process can be executed as much as possible. This limits an increase in the number of times the port injection valve 16 is driven and thus limits a decrease in the durability of the port injection valve 16. Additionally, as compared to the multiple injection process, the single injection process can enhance atomization of fuel and limits the generation of HC.

Third Embodiment

A third embodiment according to the present disclosure will now be described with reference to FIG. 13. The differences from the second embodiment will mainly be discussed.

In the above-described embodiments, for restarting, the asynchronous injection amount Qns is calculated based on the stop time Tstp immediately before the restarting. However, the temperature of the intake system of the internal combustion engine 10 may not be obtained precisely from the immediate stop time Tstp. Particularly, for a hybrid car, the internal combustion engine 10 may be often repeatedly driven and stopped within a short period of time. This problem is serious. This is because when the drive time or the stop time is short, the temperature of the intake system may be greatly affected not only by the stop time Tstp immediately before restarting but also by the previous way of driving or the previous stop time.

In the present embodiment, the asynchronous injection amount Qns is corrected based on an intermittent integration stop time InT. The intermittent integration stop time InT is an amount that becomes larger as the total stop time after the internal combustion engine 10 was driven becomes longer during the period in which the activation switch of the vehicle is on. Also, the intermittent integration stop time InT ibecomes smaller as the amount of combustion energy after restarting the internal combustion engine 10 becomes larger during that period.

Figure 13:
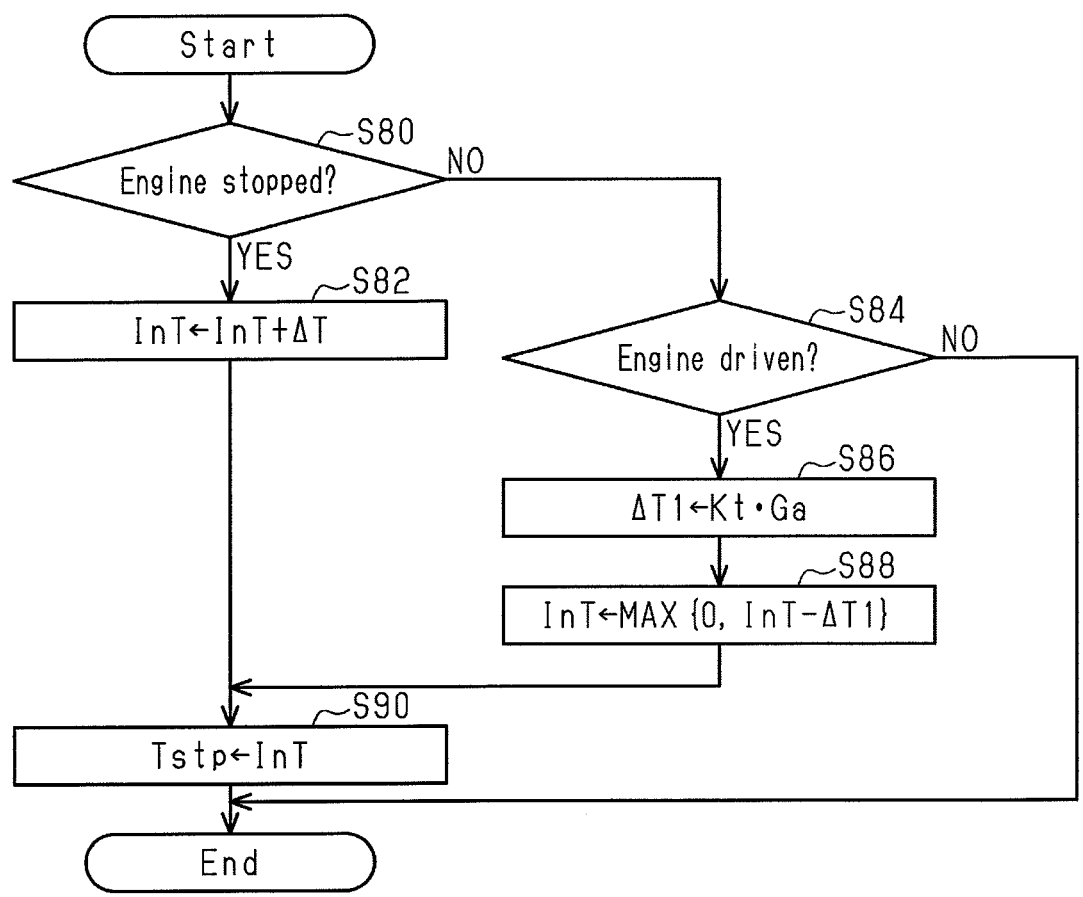
FIG. 13 is a flowchart illustrating a procedure for processes executed by a control device according to a third embodiment of the present disclosure.

FIG. 13 shows a procedure for processes for calculating the intermittent integration stop time InT. The processes shown in FIG. 13 are executed by the CPU 52 repeatedly executing programs stored in the ROM 54 at a predetermined interval.

In a series of processes shown in FIG. 13, the CPU 52 first determines whether the internal combustion engine 10 is stopped (S80). When determining that the internal combustion engine 10 is stopped (S80: YES), the CPU 52 updates the intermittent integration stop time InT with a value obtained by adding a predetermined amount ΔT, which is equal to the cycle of the series of processes shown in FIG. 13, to the intermittent integration stop time InT (S82).

When determining that the internal combustion engine 10 is not stopped (S80: NO), the CPU 52 determines whether the current time is the drive time of the internal combustion engine 10 (S84). When the current time is not a cranking time, the CPU 52 determines that the current time is the drive time of the internal combustion engine 10. When determining that the current time is the drive time of the internal combustion engine 10 (S84: YES), the CPU 52 substitutes, into a reduction correcting amount ΔT1 of the intermittent integration stop time InT, a value obtained by multiplying the intake air amount Ga by a gain Kt (S86). Then, the CPU 52 updates the intermittent integration stop time InT using the larger one of zero and a value obtained by subtracting the reduction correcting amount ΔT1 from the intermittent integration stop time InT (S88).

When completing the process of S82 or S88, the CPU 52 substitutes the intermittent integration stop time InT into the stop time Tstp (S90). This process is executed to determine a parameter used in the process of S122 in FIG. 9 or in the process of S160 in FIG. 12. Thus, the CPU 52 calculates the stop time correction coefficient Ks1 to be larger when the intermittent integration stop time InT is long than when the intermittent integration stop time InT is short.

When completing the process of S90 or when making a negative determination in the process of S84, the CPU 32 temporarily ends the series of processes shown in FIG. 13.

Correspondence

The correspondence between the items in the above embodiments and the items described in the above-described SUMMARY is as follows. In the following description, the correspondence is shown for each of the numbers in the examples described in the SUMMARY.

[6] The multiple injection process corresponds to the process illustrated in section (a) of FIG. 8, and the single injection process corresponds to the process illustrated in section (b) of FIG. 8.

The selection process corresponds to the process of FIG. 12, and the operation process corresponds to the process of S136.

[7] Example 7 corresponds to the process of S164 when the stop time Tstp is short. That is, when the stop time Tstp is short, the determination value Inth1 is zero. Thus, when the logical conjunction of the above-described conditions (xi) and (xii) is true, an affirmative determination is made in the process of S164.

[8] to [11] The asynchronous injection amount calculation process corresponds to the processes of S114 to S124. The stop time calculation process corresponds to the process of FIG. 13.

[12] The synchronous injection amount calculation process corresponds to the processes of S126 to S130.

Modifications

The above-described embodiments may be modified as follows. The above-described embodiment and the following modifications may be implemented in combination with each other as long as technical contradiction does not occur.

Asynchronous Injection Amount Calculation Process

In the above-described embodiment, when the current time is not the restart time, the asynchronous injection amount Qns is calculated based on the water temperature THW, the number of injections, and the atmospheric pressure Pa. Instead, for example, among the three parameters, the asynchronous injection amount Qns may be calculated based only on the water temperature THW, only on the water temperature THW and the number of injections, or only on the water temperature THW and the atmospheric pressure Pa.

In the above-described embodiment, when the current time is the restart time, the asynchronous injection amount Qns is calculated based on the water temperature THW, the number of injections, the stop time Tstp, and the atmospheric pressure Pa. For example, the asynchronous injection amount Qns may be calculated based on only four of the above-described five parameters, such as only the water temperature THW, the stop time Tstp, the number of injections, and the intake pressure Pin. Alternatively, the asynchronous injection amount Qns may be calculated based on only three of the parameters (for example, water temperature THW, stop time Tstp, and intake pressure Pin), only two of the parameters (for example, water temperature THW and stop time Tstp), or only one of the parameters (for example, water temperature THW).

Synchronous Injection Amount Calculation Process

In the above-described embodiment, when the current time is not the restart time, the synchronous injection amount Qs is calculated based on the water temperature THW and the atmospheric pressure Pa. For example, the synchronous injection amount Qs may be calculated using only the water temperature THW of the two parameters, namely, the water temperature THW and the atmospheric pressure Pa. In the same manner with when the current time is the restart time, the synchronous injection amount Qs may be calculated using the intake pressure Pin.

In the above-described embodiment, when the current time is not the restart time, the synchronous injection amount Qs is calculated based on the water temperature THW, the atmospheric pressure Pa, and the intake pressure Pin. For example, the synchronous injection amount Qs may be calculated based only on the water temperature THW and the intake pressure Pin of the three parameters. Instead, the synchronous injection amount Qs may be calculated based on the water temperature THW and the atmospheric pressure Pa or only on the water temperature THW of the above-described three parameters.

Intake Asynchronous Injection in Multiple Injection Process

In the above-described embodiment, the intake asynchronous injection is to inject fuel such that the period in which the fuel injected from the port injection valve 16 reaches the position of the intake valve 18 prior to opening is within the closed period of the intake valve 18. Instead, when the rotation speed NE is high and the asynchronous injection amount Qns is excessively large, part of the period in which the fuel injected from the port injection valve 16 reaches the position of the intake valve 18 prior to opening may overlap the open period of the intake valve 18.

Intake Synchronous Injection

In the above-described embodiment, the injection start timing Is is set based on the water temperature THW, the rotation speed NE, and the intake phase difference DIN. For example, only one or two of the above-described three parameters may be used to set the injection start timing Is.

Single Injection Process

In the above-described embodiment, the single injection process is a process for injecting fuel such that the period in which the fuel injected from the port injection valve 16 reaches the position of the intake valve 18 prior to opening is within the closed period of the intake valve 18. Instead, when the rotation speed NE is high and the requested injection amount Qd is large, part of the period in which the fuel injected from the port injection valve 16 reaches the position of the intake valve 18 prior to opening may overlap the closed period of the intake valve 18.

Selection Process

In the above-described embodiment, when the logical conjunction of conditions (xi), (xii), and (xiii) is true, the single injection process is selected. Instead, for example, when the logical conjunction of conditions (xi) and (xii) is true, the single injection process is selected.

Instead, for example, when condition (xi) is satisfied, the single injection process may be selected. As will be described in the section of Vehicle, this is in particular effective when the vehicle includes only the internal combustion engine as the prime mover that generates the thrust of the vehicle and does not perform the idling stop control.

For example, when an alcohol concentration such as the detection value of an alcohol concentration sensor that detects the alcohol concentration in fuel can be obtained, the determination value Inth0 and the determination value Inth1 may be variably set in accordance with the alcohol concentration. In this case, the determination value Inth0 and the determination value Inth1 are set to be larger when the alcohol concentration is high than when the alcohol concentration is low.

Control Device

The control device is not limited to a device that includes the CPU 52 and the ROM 54 and executes software processing. For example, at least part of the processes executed by the software in the above-illustrated embodiment may be executed by hardware circuits dedicated to executing these processes (such as ASIC). That is, the control device may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Vehicle

In the above-described embodiment, the hybrid vehicle including the motor generator in addition to the internal combustion engine is exemplified as the prime mover that generates the thrust of the vehicle. Instead, for example, the vehicle may include only the internal combustion engine as the prime mover that generates the thrust of the vehicle and executes the idling stop control. Even in this case, if the condition for executing the single injection process includes the above-described condition (xii), the water given temperature Tth1 is low as compared to when only condition (xi) is set.

Executing the idling stop control is not required.

Others

The internal combustion engine 10 does not need to include the characteristic varying device that changes the characteristics of the intake valve 18. The internal combustion engine 10 does not need to include the throttle valve 14.

The invention claimed is:

1. A control device for an internal combustion engine, the control device being applied to the internal combustion engine including a port injection valve that injects fuel into an intake passage, wherein
the control device is configured to execute:
a selection process for selecting a multiple injection process or a single injection process in order to inject the fuel of a requested injection amount that is an injection amount requested in a single combustion cycle, the multiple injection process executing an intake synchronous injection that injects the fuel in synchronization with an open period of an intake valve and an intake asynchronous injection that injects the fuel at a point in time that is more advanced than the intake synchronous injection, the single injection process injecting the fuel of the requested injection amount with the intake asynchronous injection; and
an operation process for executing the process selected by the selection process by operating the port injection valve, and
the selection process is a process for selecting the single injection process when a temperature of an intake system of the internal combustion engine is greater than or equal to a given temperature and selecting the multiple injection process when the temperature of the intake system is less than the given temperature.

2. The control device according to claim 1, wherein
the selection process includes a determination process for determining whether the temperature of the intake system of the internal combustion engine is greater than or equal to the given temperature,
the determination process is a process for determining that the temperature of the intake system is greater than or equal to the given temperature on the condition that an integration value of an intake air amount of the internal combustion engine is greater than or equal to a determination value, and
the control device is further configured to execute a requested injection amount calculation process for calculating the requested injection amount as an injection amount to control an air-fuel ratio to a target air-fuel ratio based on an amount of fresh air filling a cylinder of the internal combustion engine.

3. The control device according to claim 2, wherein
the control device is further configured to execute a first determination value varying process, and
the first determination value varying process sets the determination value to a larger value when a temperature of coolant in the internal combustion engine is low at a start time of the internal combustion engine than when the temperature of the coolant is high.

4. The control device according to claim 2, wherein
the control device is further configured to execute a second determination value varying process, and
the second determination value varying process sets the determination value to a larger value in a case in which a period from when the internal combustion engine is stopped to when the internal combustion engine is started is long than in a case in which the period is short.

5. The control device according to claim 2, wherein the determination process includes a process for determining that the temperature of the intake system is greater than or equal to the given temperature when a logical conjunction of the integration value being greater than or equal to the determination value and the temperature of the coolant in the internal combustion engine being greater than or equal to a predetermined temperature.

6. A control device for an internal combustion engine, the control device being applied to the internal combustion engine including a port injection valve that injects fuel into an intake passage, wherein
the control device is configured to execute:
a selection process for selecting a multiple injection process or a single injection process in order to inject the fuel of a requested injection amount calculated regardless of a detection value of an intake air amount at a start time of the internal combustion engine, the multiple injection process executing an intake synchronous injection that injects the fuel in synchronization with an open period of an intake valve and an intake asynchronous injection that injects the fuel at a point in time that is more advanced than the intake synchronous injection, the single injection process injecting the fuel of the requested injection amount with the intake asynchronous injection; and
an operation process for executing the process selected by the selection process by operating the port injection valve,
the selection process includes a process for selecting the single injection process when a temperature of coolant in the internal combustion engine is greater than or equal to a water given temperature and selecting the multiple injection process when the temperature of the coolant is less than the water given temperature, and
the selection process includes a process for selecting, in a case in which the internal combustion engine is intermittently driven, the multiple injection process until an integration value of an amount of air drawn into the intake passage becomes greater than or equal to a predetermined value even when the temperature of the coolant in the internal combustion engine is greater than or equal to the water given temperature.

7. The control device according to claim 6, wherein the selection process includes a process for selecting, in a case in which the internal combustion engine is intermittently driven, the multiple injection process until an integration value of an amount of air drawn into the intake passage becomes greater than or equal to a predetermined value even when the temperature of the coolant in the internal combustion engine is greater than or equal to the water given temperature.

8. The control device according to claim 6, wherein
the control device is further configured to execute an asynchronous injection amount calculation process for calculating an asynchronous injection amount that is an injection amount of the intake asynchronous injection in the multiple injection process, and
the asynchronous injection amount calculation process includes
a process for calculating the asynchronous injection amount to be a larger value when the temperature of the coolant in the internal combustion engine is low than when the temperature of the coolant is high, and
a process for calculating the asynchronous injection amount to be a smaller value in a case in which an elapsed time from when the internal combustion engine is stopped to when the internal combustion engine is started is short than in a case in which the elapsed time is long.

9. The control device according to claim 8, wherein
the control device is further configured to execute a stop time calculation process for calculating an intermittent integration stop time when the internal combustion engine is intermittently driven,
the stop time calculation process calculates the intermittent integration stop time by reducing, with a reduction correction ratio, an accumulated time in which the internal combustion engine is stopped, after the internal combustion engine is started the reduction correction ratio being larger when the integration value of the amount of air drawn into the intake passage is large than when the integration value of the amount of air is small, and
the asynchronous injection amount calculation process includes a process for calculating the asynchronous injection amount to be a larger value when the intermittent integration stop time is long than when the intermittent integration stop time is short.

10. The control device according to claim 9, wherein
the control device is further configured to execute a synchronous injection amount calculation process for calculating a synchronous injection amount that is an injection amount of the intake synchronous injection, and
the synchronous injection amount calculation process calculates the synchronous injection amount based on the temperature of the coolant in the internal combustion engine without depending on the elapsed time from when the internal combustion engine is stopped to when the internal combustion engine is started.

11. The control device according to claim 8, wherein the asynchronous injection amount calculation process includes a process for calculating the asynchronous injection amount to be a larger value when an atmospheric pressure is high than when the atmospheric pressure is low.

12. The control device according to claim 11, wherein
the internal combustion engine includes a throttle valve, and
the asynchronous injection amount calculation process includes a process for calculating the asynchronous injection amount to be a smaller value when an intake pressure is low than when the intake pressure is high in a case in which the start time of the internal combustion engine is a restart time of the internal combustion engine.

13. A control method for an internal combustion engine, the control method being applied to the internal combustion engine including a port injection valve that injects fuel into an intake passage, wherein
the control method comprises:
selecting a multiple injection process or a single injection process in order to inject the fuel of a requested injection amount that is an injection amount requested in a single combustion cycle, the multiple injection process executing an intake synchronous injection that injects the fuel in synchronization with an open period of an intake valve and an intake asynchronous injection that injects the fuel at a point in time that is more advanced than the intake synchronous injection, the single injection process injecting the fuel of the requested injection amount with the intake asynchronous injection; and
executing the process selected by the selection process by operating the port injection valve, and
selecting the multiple injection process or the single injection process is performed for selecting the single injection process when a temperature of an intake system of the internal combustion engine is greater than or equal to a given temperature and selecting the multiple injection process when the temperature of the intake system is less than the given temperature.

14. A non-transitory computer-readable medium that stores a program for causing a processor to execute a control process for an internal combustion engine, the control process being applied to the internal combustion engine including a port injection valve that injects fuel into an intake passage, wherein
the control process includes
selecting a multiple injection process or a single injection process in order to inject the fuel of a requested injection amount that is an injection amount requested in a single combustion cycle, the multiple injection process executing an intake synchronous injection that injects the fuel in synchronization with an open period of an intake valve and an intake asynchronous injection that injects the fuel at a point in time that is more advanced than the intake synchronous injection, the single injection process injecting the fuel of the requested injection amount with the intake asynchronous injection; and
executing the process selected by the selection process by operating the port injection valve, and
selecting the multiple injection process or the single injection process is performed for selecting the single injection process when a temperature of an intake system of the internal combustion engine is greater than or equal to a given temperature and selecting the multiple injection process when the temperature of the intake system is less than the given temperature.

* * * * *